(12) United States Patent
Yokoe et al.

(10) Patent No.: US 10,900,578 B2
(45) Date of Patent: Jan. 26, 2021

(54) VALVE DRIVE DEVICE

(71) Applicant: NIDEC SANKYO CORPORATION, Nagano (JP)

(72) Inventors: Satoru Yokoe, Nagano (JP); Takehiko Yazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/508,787

(22) Filed: Jul. 11, 2019

(65) Prior Publication Data

US 2020/0018415 A1 Jan. 16, 2020

(30) Foreign Application Priority Data

Jul. 12, 2018 (JP) ................................. 2018-132618

(51) Int. Cl.

| *F16K 11/074* | (2006.01) |
|---|---|
| *F16K 31/04* | (2006.01) |
| *F16K 31/53* | (2006.01) |
| *F16H 19/00* | (2006.01) |
| *F16H 35/00* | (2006.01) |

(52) U.S. Cl.
CPC ........ *F16K 11/0743* (2013.01); *F16H 19/001* (2013.01); *F16K 31/043* (2013.01); *F16K 31/535* (2013.01); *F16H 2035/005* (2013.01); *F16K 31/042* (2013.01); *Y10T 137/86517* (2015.04); *Y10T 137/86533* (2015.04)

(58) Field of Classification Search
CPC .... F16K 31/043; F16K 34/535; F16K 31/042; F16K 11/0743; F16H 19/001; F16H 2035/005; Y10T 137/86517; Y10T 137/86533
See application file for complete search history.

(56) References Cited

U.S. PATENT DOCUMENTS 2,465,033 A * 3/1949 Ocheltree ............. F16H 19/001
74/25
4,139,355 A * 2/1979 Turner ................ F16K 11/0743
137/625.43
(Continued)

FOREIGN PATENT DOCUMENTS

| JP | 5615993 B1 | 10/2014 |
|---|---|---|
| JP | 2018062999 A | 4/2018 |
| KR | 1020170014001 A | 2/2017 |

*Primary Examiner* — Umashankar Venkatesan
(74) *Attorney, Agent, or Firm* — Cantor Colburn LLP

(57) ABSTRACT

Provided is a valve drive device including a power transmission switching unit capable of reducing noise and improving positional accuracy to perform smooth power switching. In the valve drive device, a valve element drive mechanism includes a motor, a driving gear, a driven gear, and a power transmission switching unit configured to switch between a power transmission state and a power non-transmission state. The power transmission switching unit includes at least one convex unit formed on the driven gear, a rotation restriction unit that is pivotably mounted on the driven gear with respect to the driven gear and engageable with the at least one convex unit, and a lever pivoting restriction unit formed on the driven gear and configured to restrict the rotation restriction unit from pivoting. The rotation restriction unit includes a pivot shaft and a lever unit.

10 Claims, 26 Drawing Sheets

(56) References Cited

U.S. PATENT DOCUMENTS

| | | | | |
|---|---|---|---|---|
| 6,880,802 | B2* | 4/2005 | Hara | F16K 3/08 |
| | | | | 137/315.17 |
| 7,437,888 | B2* | 10/2008 | Son | F16K 11/074 |
| | | | | 62/527 |
| 7,793,915 | B2* | 9/2010 | Ozawa | F16K 11/074 |
| | | | | 251/248 |
| 9,903,479 | B2* | 2/2018 | Yokoe | F16K 31/535 |
| 2005/0150558 | A1* | 7/2005 | Ozawa | F16K 31/042 |
| | | | | 137/625.46 |
| 2012/0080623 | A1* | 4/2012 | Kang | F25B 41/062 |
| | | | | 251/129.12 |
| 2015/0276070 | A1* | 10/2015 | Yokoe | F16K 3/04 |
| | | | | 251/248 |
| 2017/0198817 | A1 | 7/2017 | Yokoe et al. | |
| 2019/0368627 | A1* | 12/2019 | Yokoe | F16K 31/043 |
| 2019/0368628 | A1* | 12/2019 | Yokoe | F16K 31/047 |
| 2020/0018416 | A1* | 1/2020 | Yokoe | F16K 31/047 |
| 2020/0173573 | A1* | 6/2020 | Yokoe | F25B 41/04 |

* cited by examiner

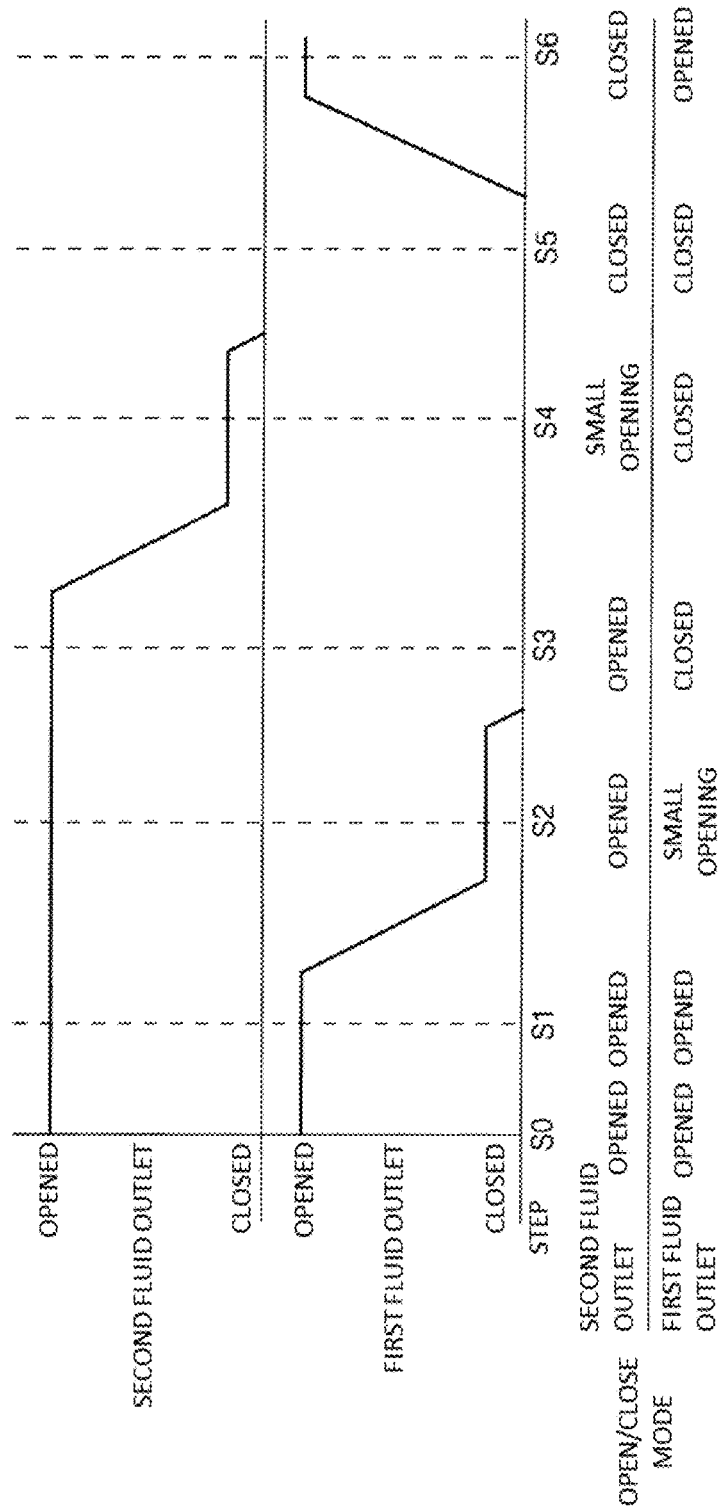

FIG. 18
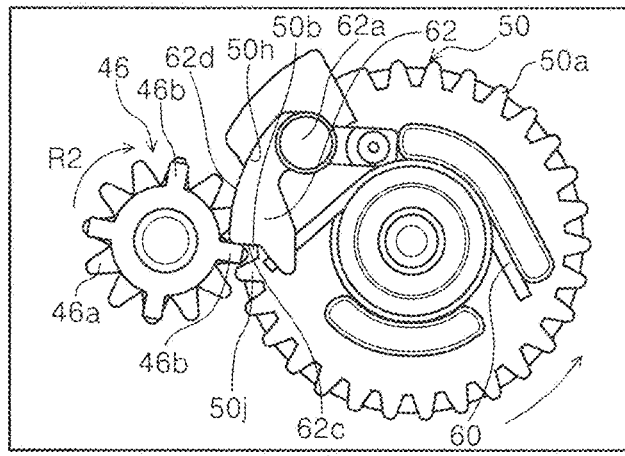
STEP7
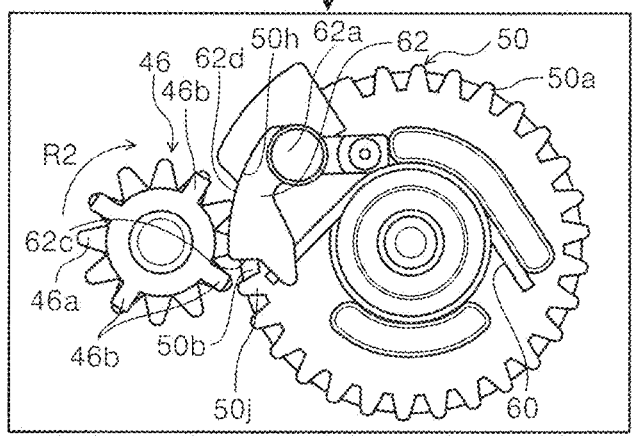
STEP8
(ORIGIN POSITION)
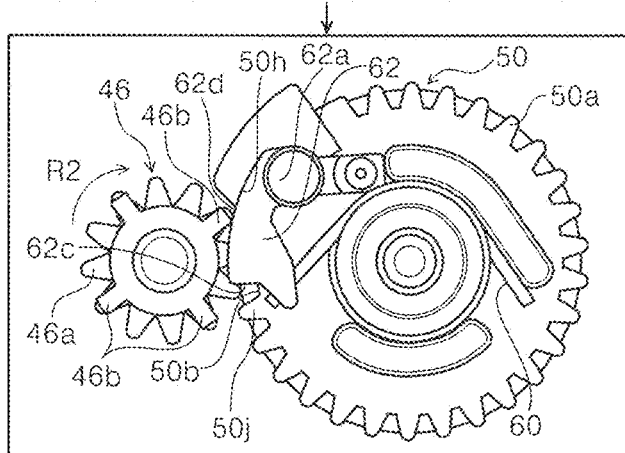
STEP9

VALVE DRIVE DEVICE

CROSS REFERENCE TO RELATED APPLICATION

The present application claims priority under 35 U.S.C. §119 to Japanese Patent Application No. 2018-132618 filed on Jul. 12, 2018, the entire content of which is incorporated herein by reference.

FIELD OF THE INVENTION

At least an embodiment of the present invention relates to a valve drive device for driving a valve configured to regulate a fluid flow rate.

BACKGROUND

Conventionally, there is a refrigerant valve device for supplying a refrigerant to cool the inside of a refrigerator or the like. Some of such refrigerant valve devices include a valve drive device configured to drive a valve to adjust the amount of the refrigerant to be supplied to the inside of the refrigerator (Japanese Patent No. 5615993).

The refrigerant valve device described in Japanese Patent No. 5615993 includes, on a base provided with a refrigerant inlet, a refrigerant outlet, and a valve seat surface: a valve element rotatable about a position close to either the refrigerant inlet or the refrigerant outlet; and a valve element drive mechanism configured to rotate the valve element. The valve element drive mechanism includes a stepping motor (hereinafter referred to as a motor), a pinion rotating integrally with a drive shaft of the motor, and an output gear that meshes with the pinion and rotates integrally with the valve element.

When the motor rotates, the output gear and hence the valve element, rotate via the pinion configured to rotate integrally with the motor. Thus, the valve element can adjust the degree of opening of either the refrigerant inlet or the refrigerant outlet and can regulate the supply amount of the refrigerant.

In this valve element drive mechanism, the pinion is rotated into a forward rotation direction to rotate the output gear and the valve element from a first rotation-restricted position to a second rotation-restricted position, which is a position obtained by rotating the motor into the forward rotation direction.

Here, when the motor is rotated in a reverse rotation direction to rotate the motor from the second rotation-restricted position to the first rotation-restricted position to adjust the supply amount of the refrigerant, an arm unit of the output gear abuts on an abutted unit of the pinion, and the rotation of the pinion in the reverse rotation direction is restricted. As a result, the motor tries to continue the rotation in the reverse rotation direction while the rotation of the pinion in the reverse rotation direction is restricted, and thus, a step-out occurs in the motor. As a result, during the step-out of the motor, the arm unit and the abutted unit may collide with each other to generate noise (collision noise).

It is discussed to achieve a configuration where in the valve element drive mechanism, the transmission of power from the pinion to the output gear at the first rotation-restricted position is cut off to prevent the step-out of the motor and to suppress the generation of the noise, for example.

Incidentally, if the valve element drive mechanism is configured to cut off the transmission of power from the pinion to the output gear at the first rotation-restricted position, a desirable configuration is where the pinion meshes with the output gear to enable power transmission to rotate the output gear from the first rotation-restricted position to the second rotation-restricted position. That is, a power switching means is desirably provided in the valve element drive mechanism. For example, it is discussed that the power switching means includes a clutch mechanism or the like, in which if the pinion is rotated in the reverse rotation direction at the first rotation-restricted position, the pinion and the output gear do not mesh with each other; and if the pinion is rotated in the forward rotation direction, the pinion and the output gear mesh with each other.

Here, in the above clutch mechanism, one of the configurations for switching the power transmission state is discussed, for example, in which a lever member provided at the side of the output gear and urged toward the pinon is pivoted to switch between a contact state and a non-contact state of the lever member and the pinion to switch the power transmission state.

In this configuration, when the lever member can be pivoted about the pivot shaft and the lever member is urged toward the pinion, a state where the lever member contacts the pinion and a state where the lever member is separated from the pinion against an urging force for urging the lever member can be switched. In such a configuration, when the lever member urged by the urging force is contacted with the positioning unit, a position of the lever member in the state where the lever member is separated from the pinion can be determined. As a result, a contact position of the pinion and the lever member can be secured.

However, a configuration in which the positioning unit contacts the pivot shaft of the lever member to position the lever member is influenced due to a variation in dimension of the pivot shaft generated when the lever member is manufactured. As a consequence, when the lever member is positioned in the positioning unit, the position at a distal end unit of the lever member may possibly vary. As a result, the variation also affects the contact position of the lever member and the pinion, and therefore, power switching of a power switching means may not be smoothly performed.

At least an embodiment of the present invention has been made in view of the above problems, and an object thereof is to provide a valve drive device including a power transmission switching unit capable of reducing noise and improving positional accuracy to perform smooth power switching.

SUMMARY

According to one aspect of the present disclosure, there is provided a valve drive device including a valve element drive mechanism configured to drive a valve element, wherein the valve element drive mechanism comprises: a motor; a driving gear configured to be rotationally driven by the motor; a driven gear configured to rotate the valve element by rotation of the driving gear while meshing with the driving gear; and a power transmission switching unit configured to switch between a power transmission state where the driving gear meshes with the driven gear to transmit power of the motor to the driven gear and a power non-transmission state where a meshing state between the driving gear and the driven gear is released, the power transmission switching unit includes: at least one convex unit formed on the driving gear and protruding toward a radial direction of the driving gear; and a rotation restriction unit that is pivotably mounted on the driven gear with respect to the driven gear and configured to be engageable with the at least one convex unit, and the rotation restriction unit includes: a pivot shaft inserted in the driven gear; and a lever unit extending from the pivot shaft in a circumferential direction of the driven gear and urged outward in a radial direction of the driven gear, and the driven gear includes a lever pivoting restriction unit configured to contact the lever unit of the rotation restriction unit to restrict the rotation restriction unit from pivoting radially outward, and in a state where the lever pivoting restriction unit restricts the rotation restriction unit from pivoting, a gap is formed between the lever pivoting restriction unit and the pivot shaft.

In this aspect, in a state where the lever pivoting restriction unit contacts the rotation restriction unit to restrict the rotation restriction unit from pivoting, a gap is formed between the lever pivoting restriction unit and the pivot shaft, and thus, direct contact between the lever pivoting restriction unit and the pivot shaft can be avoided. This eliminates a need of positioning the rotation restriction unit at a portion of the pivot shaft, and the lever pivoting restriction unit contacts a region other than the pivot shaft of the rotation restriction unit to perform the positioning, and therefore, it is possible to alleviate an influence due to a variation in dimension or the like of the pivot shaft, and it is possible to secure a positional accuracy of a distal end of the lever unit in a state where the rotation restriction unit does not contact the convex unit.

Further, in this aspect, the meshing state between the driving gear and the driven gear is switched in the power transmission switching unit to switch the state of the power transmission, and thus, there is no need to step out the motor. Therefore, noise can be reduced.

In the valve drive device according to at least an embodiment of the present invention, the lever unit of the rotation restriction unit includes: a first contact unit configured to contact the at least one convex unit when the driving gear rotates in a first direction; and a second contact unit configured to contact the at least one convex unit when the driving gear rotates in a second direction opposite to the first direction, wherein when the at least one convex unit contacts the first contact unit, the rotation restriction unit is pressed by the at least one convex unit to rotate the driven gear, and teeth of the driving gear and teeth of the driven gear mesh with each other such that the power transmission state is obtained, and when the at least one convex unit contacts the second contact unit, the rotation restriction unit pivots radially inward against an urging force that urges the rotation restriction unit, and the driving gear rotates idly without the teeth of the driving gear meshing with the teeth of the driven gear to maintain the power non-transmission state.

The lever unit of the rotation restriction unit according to this aspect includes: a first contact unit configured to contact the at least one convex unit when the driving gear rotates in a first direction; and a second contact unit configured to contact the at least one convex unit when the driving gear rotates in a second direction opposite to the first direction, wherein when the at least one convex unit contacts the first contact unit, the rotation restriction unit is pressed by the at least one convex unit to rotate the driven gear, and teeth of the driving gear and teeth of the driven gear mesh with each other such that the power transmission state is obtained, and when the at least one convex unit contacts the second contact unit, the rotation restriction unit pivots radially inward against an urging force that urges the rotation restriction unit, and the driving gear rotates idly without the teeth of the driving gear meshing with the teeth of the driven gear to maintain the power non-transmission state. Therefore, power can be transmitted or disconnected from the motor to the driven gear solely by switching a portion to be contacted by the at least one convex unit in accordance with a rotation direction of the driving gear, and therefore, the rotation restriction unit can have a simple configuration.

In the valve drive device according to at least an embodiment of the present invention, when a part of the second contact unit contacts the lever pivoting restriction unit, the lever unit being urged outward in the radial direction of the driven gear is restricted from pivoting radially outward.

In this aspect, the second contact unit is provided on the lever unit extending in the circumferential direction of the driven gear from the pivot shaft in the rotation restriction unit and the second contact unit contacts the lever pivoting restriction unit to restrict the lever unit from pivoting radially outward, and thus, a contact position of the rotation restriction unit with the lever pivoting restriction unit can be set to a position separated from the pivot shaft, and when the contact position is provided on the lever unit, the rotation restriction unit can be restricted from pivoting at a position close to a distal end position of the lever unit. As a result, the positional accuracy of the distal end position of the lever unit can be improved in a state where the rotation restriction unit is restricted by the lever pivoting restriction unit.

In the valve drive device according to at least an embodiment of the present invention, the second contact unit of the lever unit is located on an outer peripheral side in the radial direction of the driven gear, and is formed as a curved surface extending along the circumferential direction of the driven gear.

In this aspect, the second contact unit of the lever unit is located on the outer peripheral side in the radial direction of the driven gear and is formed as a curved surface extending along the circumferential direction of the driven gear, and thus, the second contact unit contacts the at least one convex unit and is pivoted radially inward of the driven gear, and when the at least one convex unit is separated from the second contact unit, the curved surface of the second contact unit can be located closer to the at least one convex unit to be contacted next, as compared to a case where the second contact unit is linearly formed. In other words, the second contact unit having contacted the at least one convex unit is separated from the at least one convex unit at a position close to a position restricted by the lever pivoting restriction unit. As a result, as compared with the case where the second contact unit is formed linearly, a momentum when the second contact unit and the lever pivoting restriction unit contact when the at least one convex unit is separated from the second contact unit can be alleviated. As a result, it is possible to suppress generation of noise at the time of contact between the second contact unit and the lever pivoting restriction unit in a pivot operation of the rotation restriction unit.

The valve drive device according to at least an embodiment of the present invention further includes an urging member configured to urge the rotation restriction unit outward in the radial direction of the driven gear.

In this aspect, the above-described operation and effect can be obtained.

The valve drive device according to at least an embodiment of the present invention further includes, at a distal end of the lever unit, an urging member contact unit configured to receive an urging force of the urging member.

In this aspect, at the distal end of the lever unit, the urging member contact unit configured to receive the urging force of the urging member is provided, and thus, the urging force for urging the rotation restriction unit can be acted on the distal end of the lever unit. Here, a torque to be applied to the rotation restriction unit can be obtained by multiplying a distance between the pivot shaft and the urging member contacting unit by a magnitude of the urging force. Therefore, even if the urging force is small, a larger torque can be obtained, and after the contact with the at least one convex unit is released, the distal end of the lever unit can be reliably returned to a position before the contact with the at least one convex unit.

In the valve drive device according to at least an embodiment of the present invention, the urging member is a torsion spring held on a shaft unit of the driven gear, the driven gear is provided with a holding unit configured to hold one end of the torsion spring, and the other end of the torsion spring urges the urging member contact unit.

In this aspect, the urging member is a torsion spring held on a shaft unit of the driven gear, the driven gear is provided with a holding unit configured to hold one end of the torsion spring, the other end of the torsion spring urges the urging member contact unit, and thus, the holding configuration of the urging member in the driven gear can be simplified.

In the valve drive device according to at least an embodiment of the present invention, the driven gear has a protruding unit configured to protrude radially outward and in an axial direction of the driven gear from one surface of the driven gear, and in the protruding unit, the lever pivoting restriction unit is formed on an inner side in the radial direction of the driven gear.

In this aspect, the above-described operation and effect can be obtained.

In the valve drive device according to at least an embodiment of the present invention, the driven gear has a hole unit configured to penetrate the driven gear in the axial direction of the driven gear, a part of the hole unit is formed in the protruding unit, and the protruding unit has, at a position corresponding to the hole unit, a support surface extending along the axial direction of the driven gear and configured to support the pivot shaft.

In this aspect, the protruding unit has, at a position corresponding to the hole unit, the support surface extending along the axial direction of the driven gear and configured to support the pivot shaft, and thus, the support surface can support the pivot shaft to suppress collapsing of the pivot shaft. As a result, pivoting of the rotation restriction unit about the pivot shaft can be made smoother.

In the valve drive device according to at least an embodiment of the present invention, the driven gear includes a co-rotation prevention unit configured to restrict the driven gear from rotating in a rotation direction in accordance with a rotation direction of the driving gear by being pressed by the at least one convex unit in a rotation direction of the convex unit, when the at least one convex unit contacts the second contact unit and the rotation restriction unit pivots radially inward against the urging force that urges the rotation restriction unit.

In this aspect, co-rotation of the driven gear due to the driving gear can be restricted by the co-rotation prevention unit, and thus, a state of idle rotation of the driving gear can be maintained and the power non-transmission state can be surely maintained.

In at least an embodiment of the present invention, the direct contact between the lever pivoting restriction unit and the pivot shaft can be avoided. This eliminates a need of positioning the rotation restriction unit at a portion of the pivot shaft and the lever pivoting restriction unit contacts a region other than the pivot shaft of the rotation restriction unit to perform the positioning, and therefore, it is possible to alleviate an influence due to a variation in dimension or the like of the pivot shaft, and it is possible to secure a positional accuracy of a distal end of the lever unit in a state where the rotation restriction unit does not contact the at least one convex unit. Further, in at least an embodiment of the present invention, the meshing state between the driving gear and the driven gear can be switched in the power transmission switching unit to switch the power transmission states, and thus, there is no need to step out the motor. Therefore, noise can be reduced.

The accompanying drawings, which are incorporated in and constitute a part of the specification, illustrate embodiments of the present disclosure, and together with the general description given above and the detailed description of the embodiments given below, serve to explain the principles of the present disclosure.

FIG. 14 represents an opened and closed state of a first valve and a second valve in each step;

FIG. 18 illustrates a state of the valve element drive mechanism in an origin returning operation;

DETAILED DESCRIPTION

Figure 1:
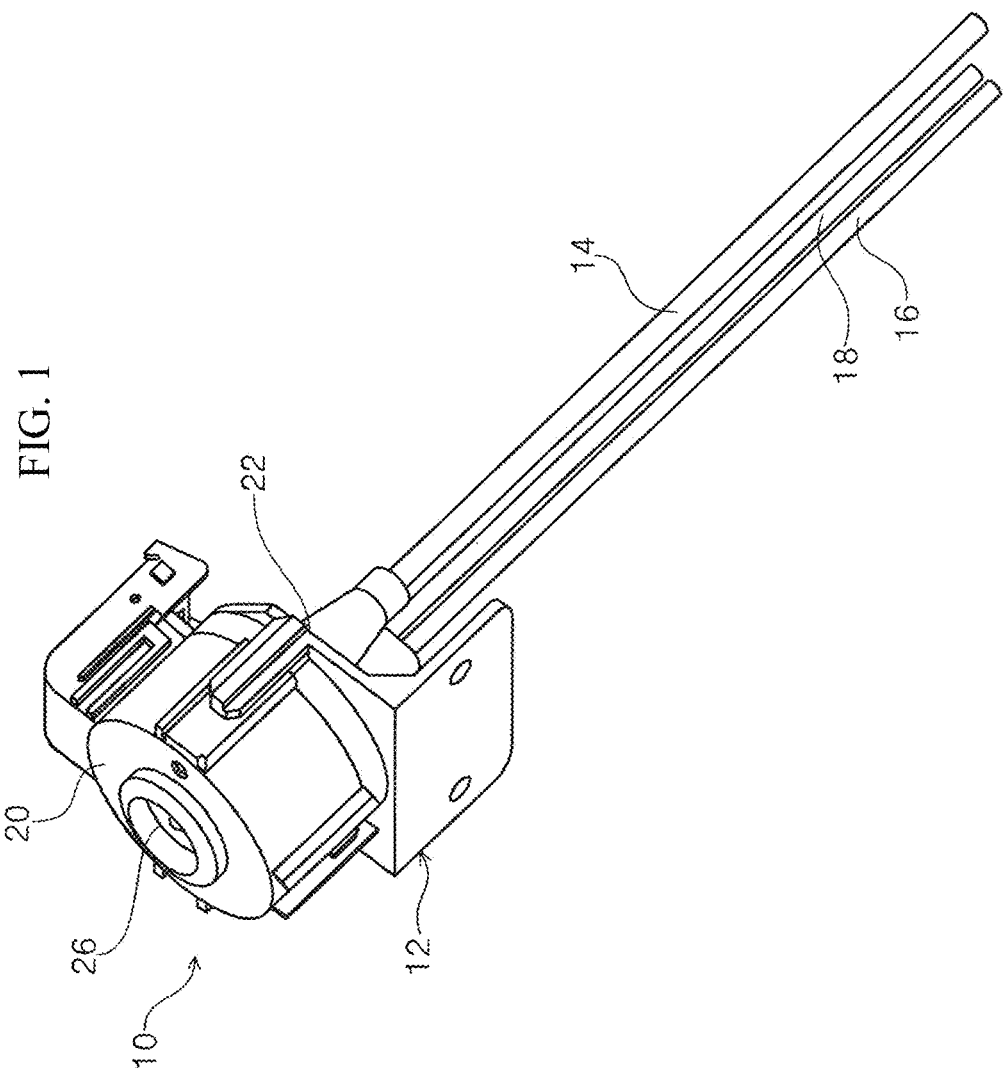
FIG. 1 is a perspective view of a valve drive device according to the present embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Embodiment (Overview of Valve Drive Device)

A valve drive device 10 according to the present embodiment will be described with reference to FIG. 1 to FIG. 4. The valve drive device 10 may be mounted in a refrigerator as an example, and adjusts the supply amount of a refrigerant (fluid) for cooling inside the refrigerator. The valve drive device 10 includes a valve main body 12, an inflow pipe 14 extending from the valve main body 12, a first outflow pipe 16 and a second outflow pipe 18 each extending parallel to the inflow pipe 14, and a cover member 20 configured to cover an upper portion of the valve main body 12. It is noted that in the following description, for convenience, the extending direction of the inflow pipe 14, the first outflow pipe 16, and the second outflow pipe 18 is defined as the up-down direction, the valve main body 12 is defined as the upper side, and the inflow pipe 14, the first outflow pipe 16, and the second outflow pipe 18 are defined as the lower side.

Figure 2:
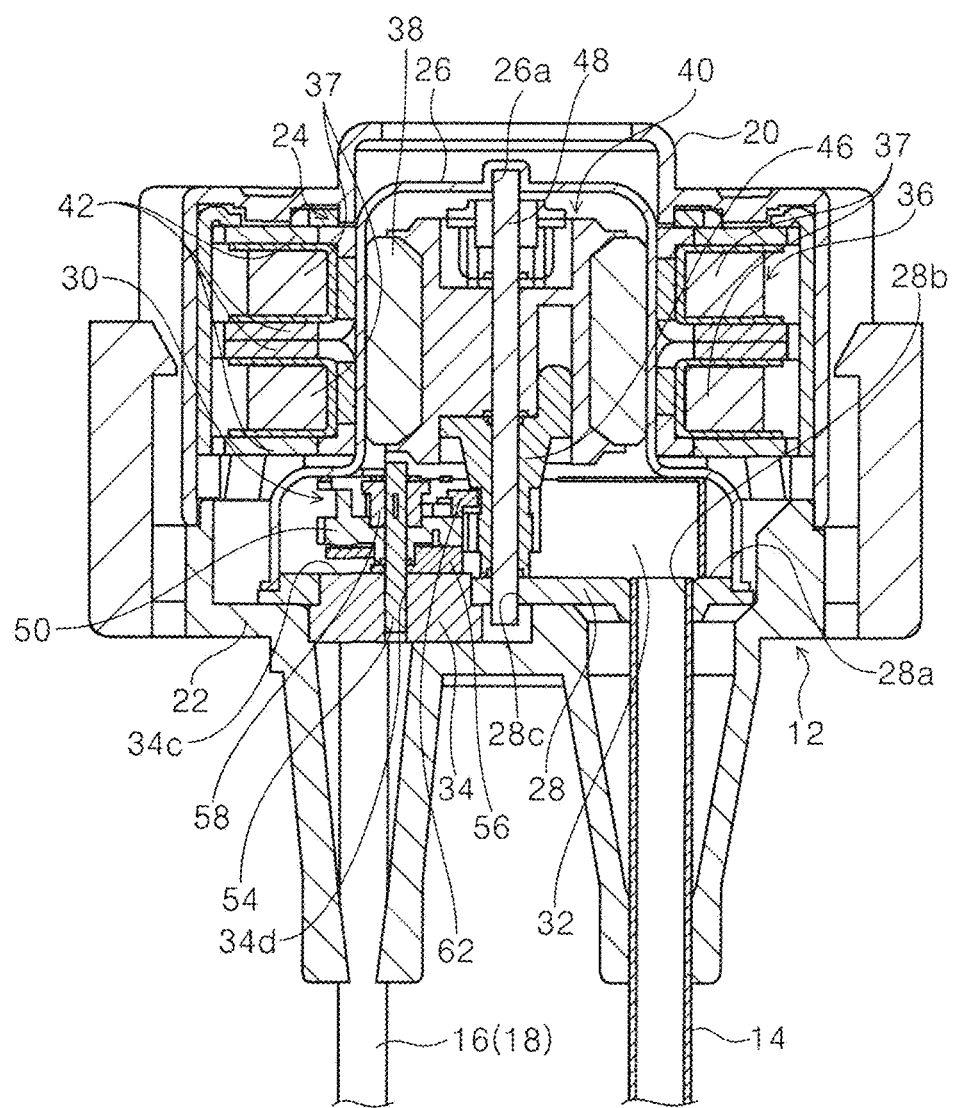
FIG. 2 is a side sectional view of the valve drive device according to the present embodiment.

In FIG. 2, the valve main body 12 includes a base member 22, a motor 24, a sealing cover 26, a base main body 28, and a valve element drive mechanism 30. The base main body 28 has an upper surface 28a. The inflow pipe 14, the first outflow pipe 16, and the second outflow pipe 18 are each attached to the base main body 28. The sealing cover 26 is attached to an upper portion of the base main body 28. The base main body 28 and the sealing cover 26 form a valve chamber 32.

Figure 3:
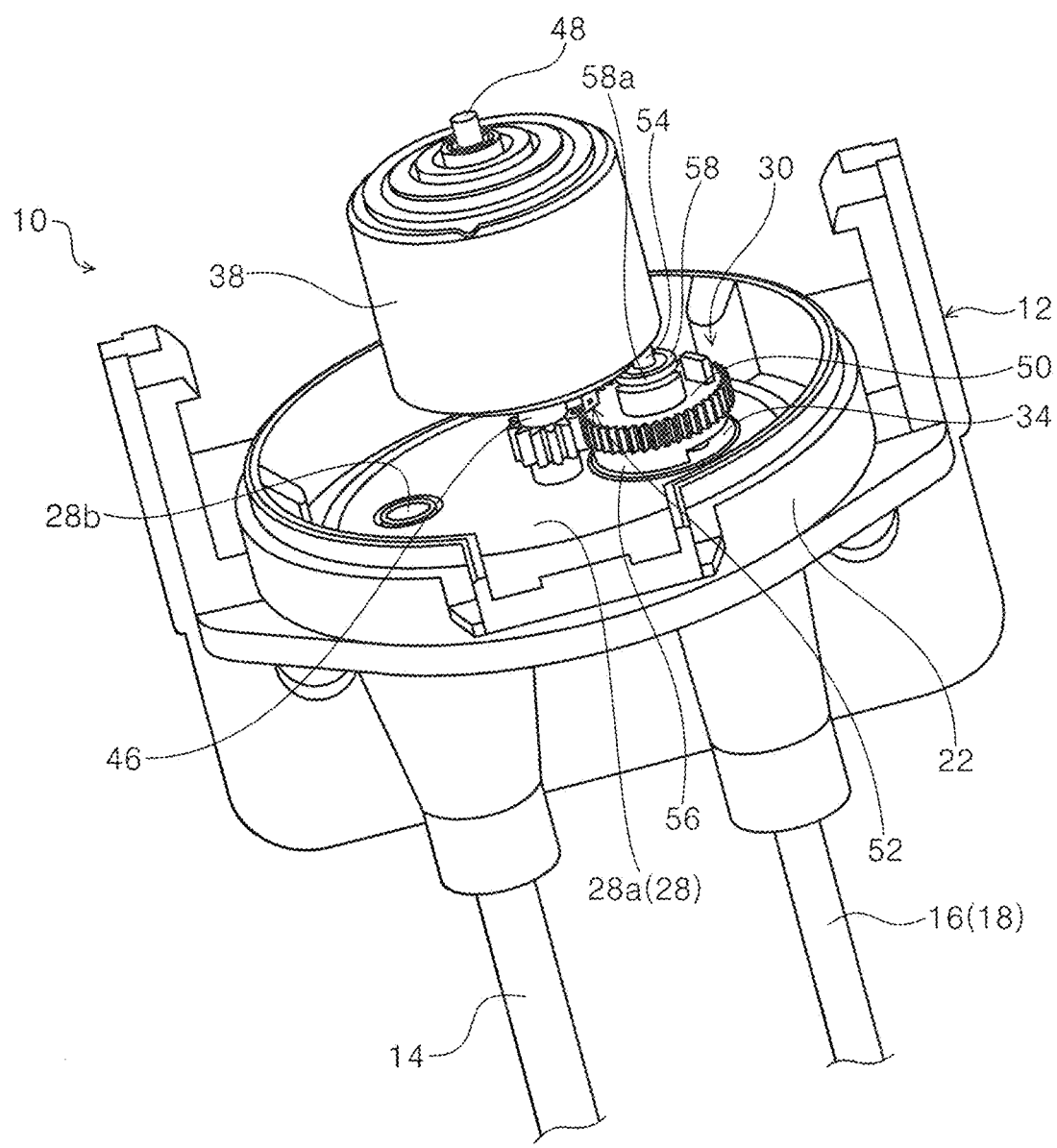
FIG. 3 is a perspective view of a valve element drive mechanism in the valve drive device.

As illustrated in FIG. 3, a fluid inlet 28b is formed on the upper surface 28a. The fluid inlet 28b is in communication with the inflow pipe 14 attached to the base main body 28. A refrigerant (fluid) is supplied from the inflow pipe 14 into the valve chamber 32.

On the other hand, a valve seat constitutional member 34 (see FIG. 2, FIG. 3, FIG. 7, and FIG. 15 to FIG. 17) is attached to the base main body 28. The valve seat constitutional member 34 is attached with the first outflow pipe 16 and the second outflow pipe 18, and a first fluid outlet 34a in communication with the first outflow pipe 16 and a second fluid outlet 34b in communication with the second outflow pipe 18 are provided in the valve seat constitutional member 34. The fluid supplied from the inflow pipe 14 into the valve chamber 32 flows out from the first fluid outlet 34a to the first outflow pipe 16, or from the second fluid outlet 34b to the second outflow pipe 18.

As illustrated in FIG. 2, the motor 24 includes a stator 36 and a rotor 40 attached with a drive magnet 38. The stator 36 is arranged so as to surround the rotor 40 with the sealing cover 26 interposed therebetween.

In the present embodiment, the stator 36 is provided with a core member 42 as illustrated in FIG. 2. A winding is wound as a drive coil 37 in the core member 42 of the stator 36. One end of the drive coil 37 (winding) wound around the stator 36 is bound and connected to one end of a non-illustrated motor terminal. The non-illustrated motor terminal is electrically coupled to a non-illustrated connector, substrate, or the like to supply electric power to the stator 36.

As illustrated in FIG. 2 and FIG. 3, the rotor 40 includes the drive magnet 38, a driving gear 46, and a spindle 48. In the spindle 48, the driving gear 46 and the drive magnet 38 are rotatably attached to the spindle 48. The drive magnet 38 is attached to the driving gear 46. The upper end of the spindle 48 is supported by a bearing unit 26a formed in the sealing cover 26, and the lower end of the spindle 48 is supported by a bearing unit 28c formed in the base main body 28. In the present embodiment, the rotor 40 is configured to rotate within the valve chamber 32 about the spindle 48 as the rotation center by the drive magnet 38 when the stator 36 (drive coil 37) is excited.

(Overview of Valve Element Drive Mechanism)

Figure 4:
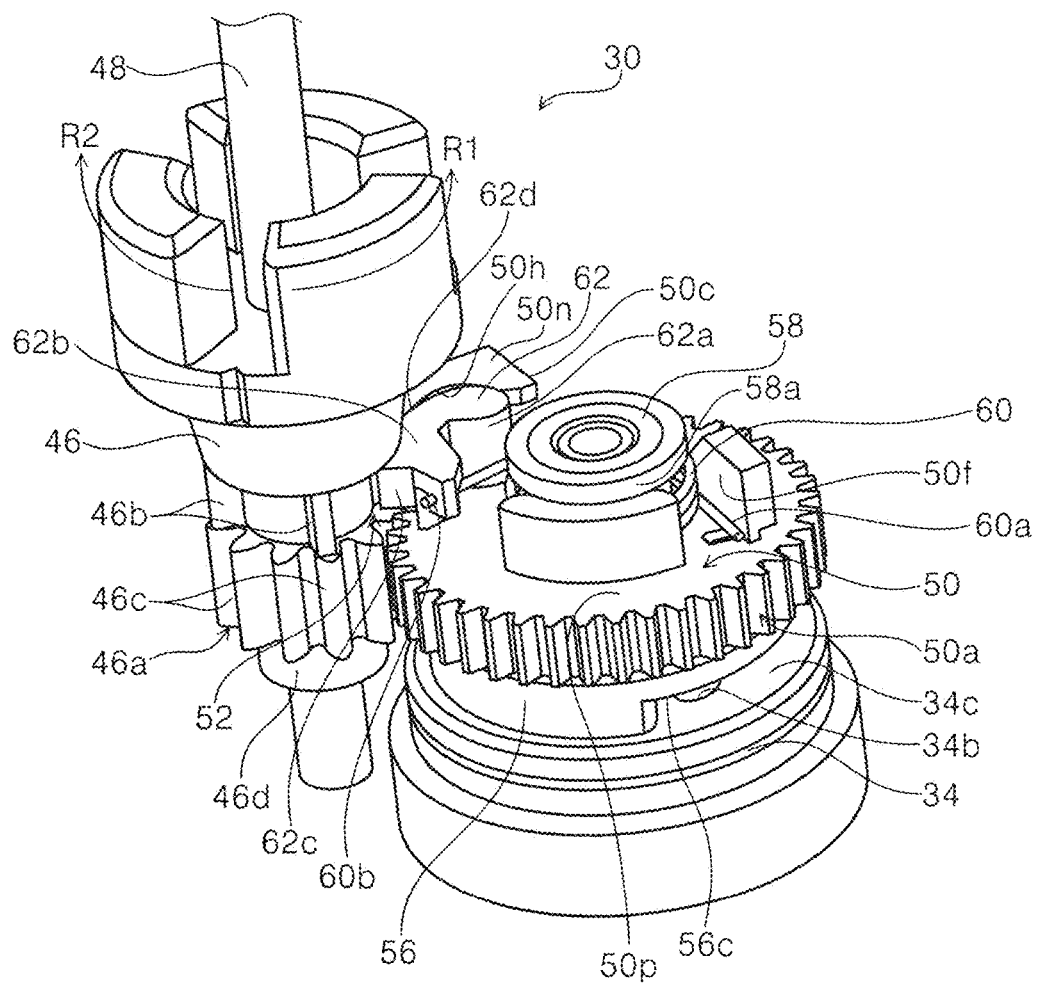
FIG. 4 is a perspective view of the valve element drive mechanism in the valve drive device.

A configuration of the valve element drive mechanism 30 will be described with reference to FIG. 3 to FIG. 12. As illustrated in FIG. 3 and FIG. 4, the valve element drive mechanism 30 includes the motor 24, the driving gear 46, a driven gear 50, and a power transmission switching unit 52. The power transmission switching unit 52, which will be described later, is configured to switch between a power transmission state where power is transmitted between the driving gear 46 and the driven gear 50 and a power non-transmission state in which the power is not transmitted. In the present embodiment, the power transmission switching unit 52 includes a convex unit 46b of the driving gear 46 described later and a rotation restriction unit 62.

Figure 5:
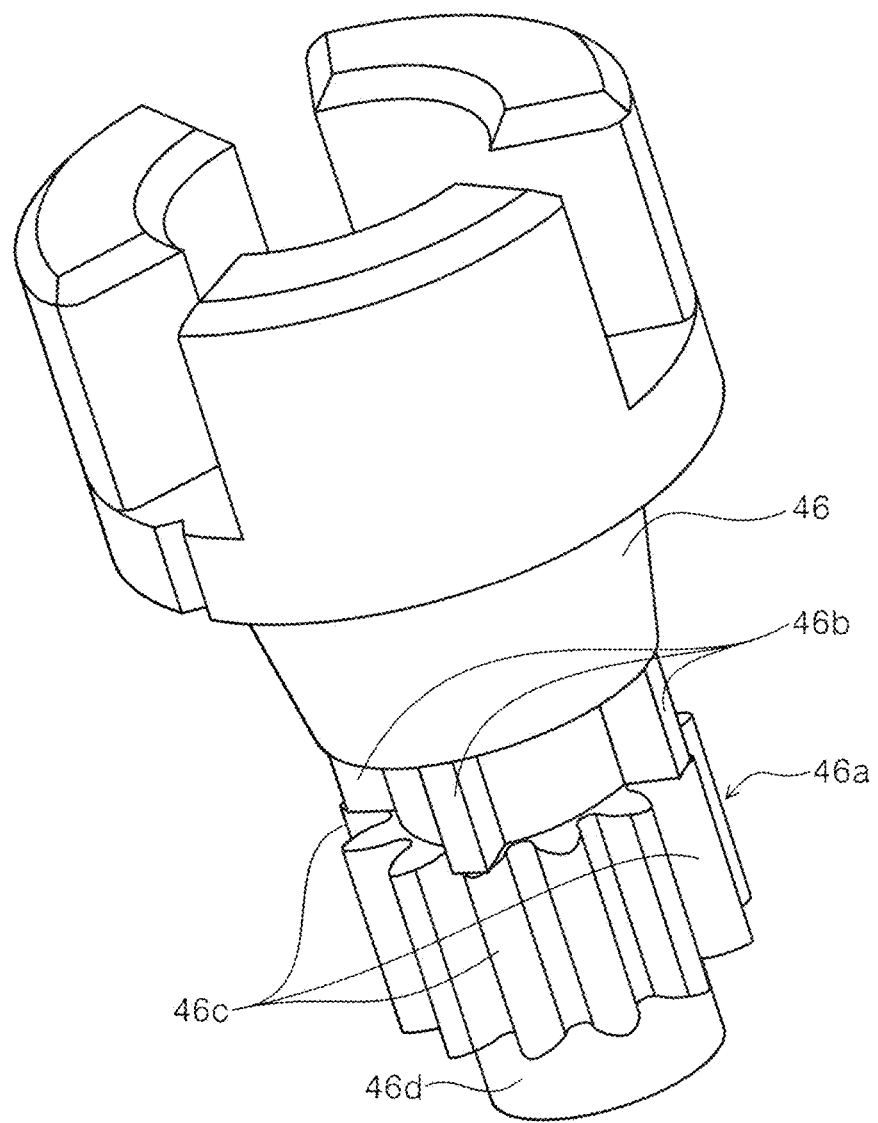
FIG. 5 is a perspective view of an output gear.
Figure 6:
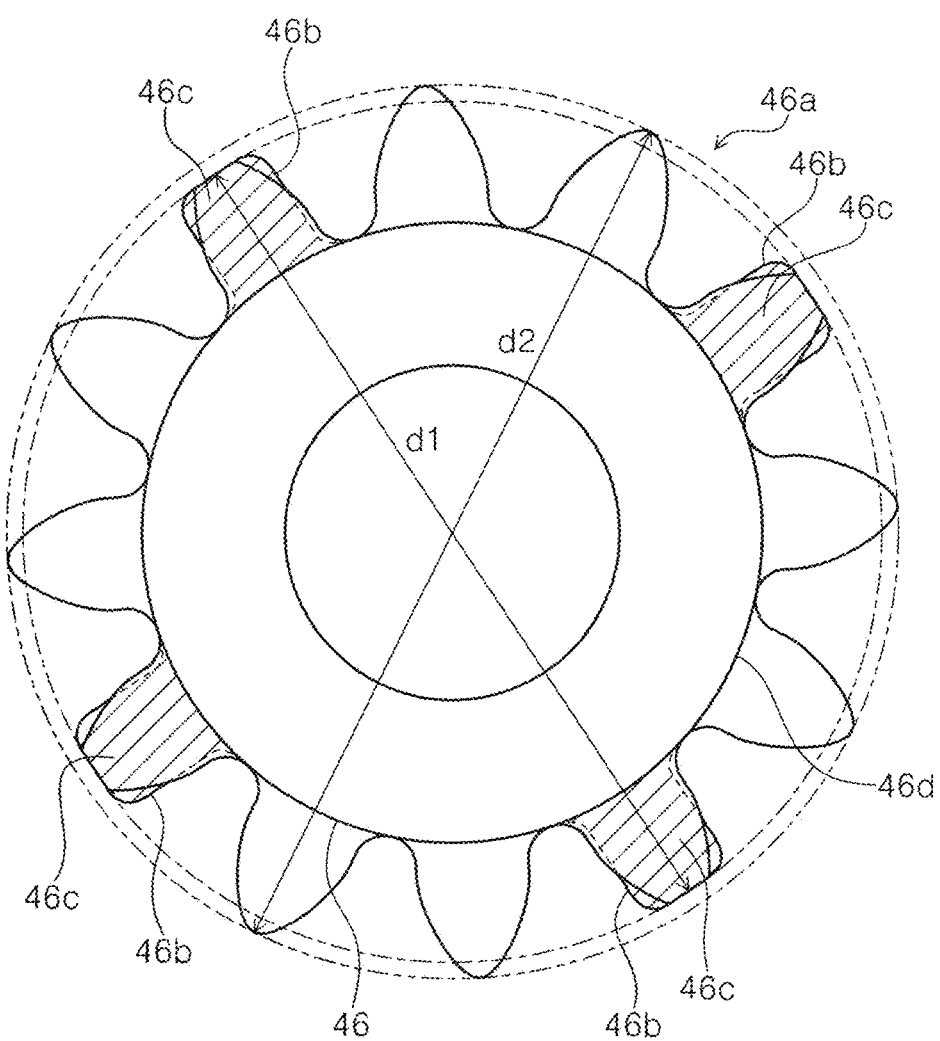
FIG. 6 is a plan view of the output gear.

As illustrated in FIG. 5 and FIG. 6, a gear unit 46a is formed at a lower end of the driving gear 46.

A plurality of convex units 46b are formed above the gear unit 46a. The tooth of the gear unit 46a corresponding to the convex unit 46b in the circumferential direction of the driving gear 46 is configured as a lock avoidance tooth 46c.

The plurality of convex units 46b protrude from a main body 46d of the driving gear 46 radially outward of the driving gear 46. In the present embodiment, the convex unit 46b may be formed in a flat plate shape as an example. It is noted that the shape of the convex unit 46b is not limited to a flat plate shape, and may be any shape as long as the convex unit 46b can be engaged with the rotation restriction unit 62 described later. In the present embodiment, the plurality of convex units 46b are each formed at positions corresponding to the N pole or the S pole of the drive magnet 38 in the circumferential direction of the driving gear 46.

In the present embodiment, the number of magnetic poles of the drive magnet 38 is, for example, eight. Thus, in the present embodiment, the convex units 46b are arranged at four positions in the driving gear 46. Specifically, the convex units 46b are arranged in the driving gear 46 at equal intervals in the circumferential direction of the driving gear 46, and in the present embodiment, the convex units 46b are formed at four positions, and thus, are arranged at 90 degrees intervals (see FIG. 18 to FIG. 21). In the present embodiment, the convex unit 46b is formed to have a thickness corresponding to the tooth thickness of the tooth of the gear unit 46a of the driving gear 46.

Referring to FIG. 6, in the present embodiment, the addendum circle diameter of the lock avoidance tooth 46c is set to d1. On the other hand, in the gear unit 46a, the addendum circle diameter of teeth other than the lock avoidance tooth is set to d2. In the present embodiment, the addendum circle diameter d1 is set to be smaller than the addendum circle diameter d2. It is noted that the circle indicated by a dot-dashed line in FIG. 6 illustrates the addendum circle diameter of the lock avoidance tooth 46c, and the circle indicated by a two-dot chain line illustrates the addendum circle diameter of the teeth other than the lock avoidance tooth 46c.

Next, the configuration at the side of the driven gear 50 to be driven to rotate with respect to the driving gear 46 will be described. As illustrated in FIG. 2, a spindle 54 is inserted at the center in the radial direction of the driven gear 50. The driven gear 50 is configured to be rotatable about the spindle 54. Below the driven gear 50, a valve element 56 is arranged. In the present embodiment, the valve element 56 is configured to be integrally rotatable with the driven gear 50 about the spindle 54. Below the valve element 56, the valve seat constitutional member 34 is arranged. The upper surface of the valve seat constitutional member 34 is configured as a valve seat surface 34c.

Further, a through hole 34d is provided at the center of the valve seat constitutional member 34, and the spindle 54 is inserted thereinto. It is noted that in FIG. 4, the illustration of the spindle 54 is omitted. In FIG. 4, the arrow with reference numeral R1 indicates a first direction being one rotation direction of the driving gear 46, and the arrow with reference numeral R2 indicates a second direction being the other rotation direction of the driving gear 46.

A holding member 58 is attached to an upper portion of the driven gear 50. The spindle 54 is passed through the holding member 58. Further, the holding member 58 is configured as a cylindrical member having a flange unit 58a formed at the upper portion, and a cylindrical unit 58b passes through a torsion spring 60 as an "urging member" to be held. Further, the lever-shaped rotation restriction unit 62 is attached to the upper portion of the driven gear 50.

(Driven Gear)

Referring to FIG. 4 and FIG. 7 to FIG. 10, the driven gear 50 has a meshing unit 50a in which a plurality of teeth are continuously formed along the circumferential direction on the outer peripheral portion and a non-meshing unit 50b in which no teeth are formed. Further, in the outer peripheral portion of the driven gear 50, a first rotation restriction unit 50c configured to restrict the rotation of the driven gear 50 in the first direction R1 is provided at an end of the meshing unit 50a on the second direction R2 side; and the non-meshing unit 50b is provided at an end of the meshing unit 50a on the first direction R1 side.

Further, a second rotation restriction unit 50k as a "co-rotation prevention unit" is provided at an end of the non-meshing unit 50b on the first direction R1 side. It is noted that in FIG. 8 and FIG. 9, the arrow with reference numeral R1 indicates the driven rotation direction of the driven gear 50 when the driving gear 46 rotates in the first direction, and the arrow with reference numeral R2 indicates the driven rotation direction of the driven gear 50 when the driving gear 46 rotates in the second direction. It is noted that the reference numeral for the second rotation restriction unit 50k is omitted in FIG. 18 to FIG. 21.

Figure 15:
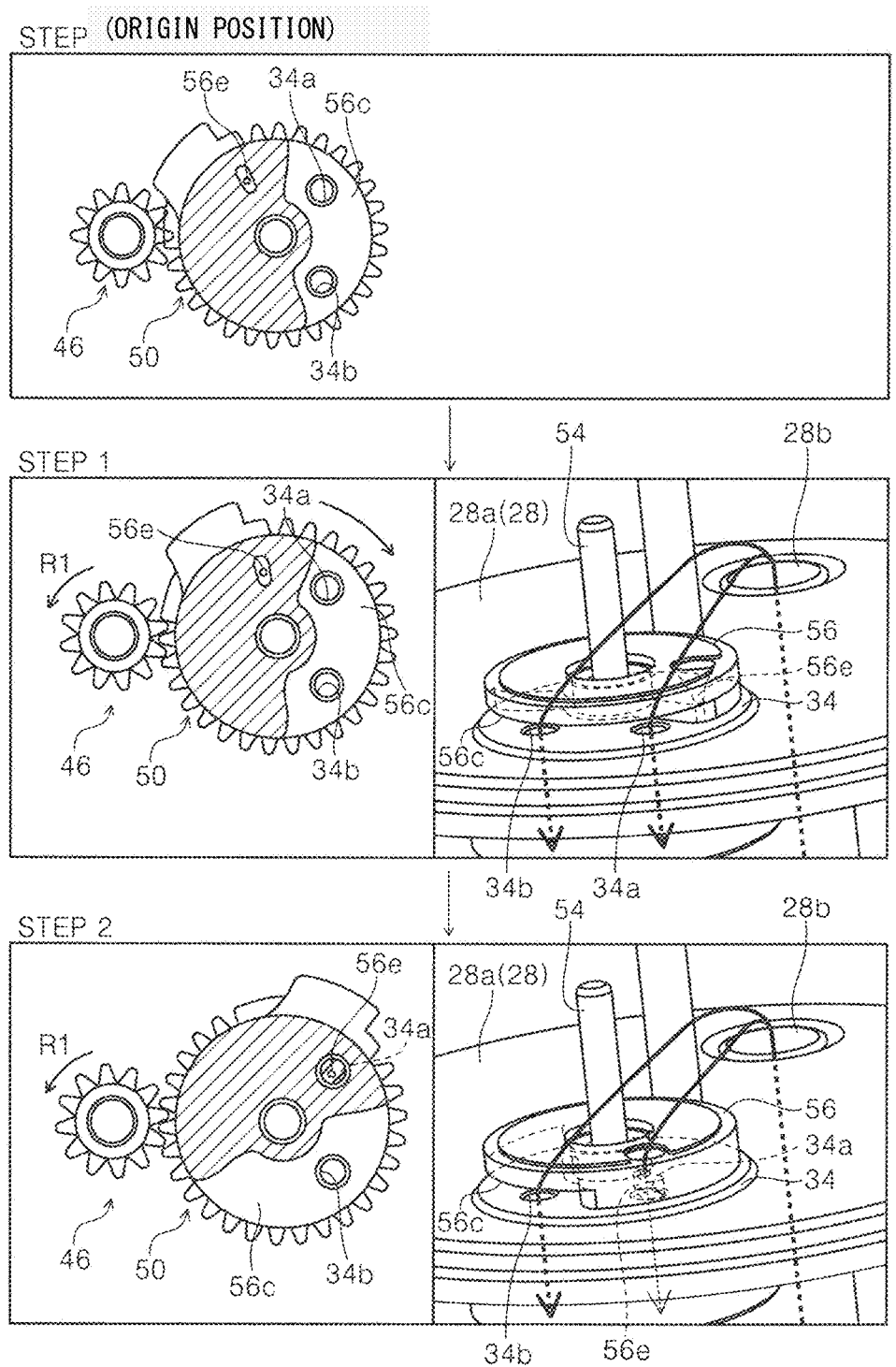
FIG. 15 illustrates phase states of the output gear and the driven gear and a state of the valve element.

It is noted that in the present embodiment, as illustrated mainly in step S0 of FIG. 15, when the reference circle diameter of the driving gear 46 and the reference circle diameter of the driven gear 50 are compared, the reference circle diameter of the driven gear 50 is formed to be larger. In addition, the number of teeth of the gear unit 46a of the driving gear 46 is smaller than the number of teeth formed on the meshing unit 50a of the driven gear 50. Therefore, in the power transmission state where the gear unit 46a of the driving gear 46 and the meshing unit 50a of the driven gear 50 mesh with each other to rotate, the rotation of the motor 24 can be decelerated and transmitted to the driven gear 50, and thus, even with a small power source, a large torque can be obtained, and the valve element 56 described later can be surely driven.

Further, as illustrated in FIG. 7 to FIG. 10, a through hole 50d into which the spindle 54 is inserted is arranged at the center of the driven gear 50. Further, a concave unit 50e is formed around the through hole 50d on an upper surface 50p of the driven gear 50 and is configured to receive a part of the holding member 58 and engage with the holding member 58. The holding member 58 engaged with the concave unit 50e constitutes a shaft unit of the driven gear 50 as well as the spindle 54 and holds the torsion spring 60.

In addition, an arc-shaped holding unit 50f is arranged to surround the concave unit 50e on the upper surface 50p of the driven gear 50. As illustrated in FIG. 4, the holding unit 50f is configured to engage with one end 60a of the torsion spring 60 and hold the one end 60a. Further, on the upper surface 50p of the driven gear 50, a through hole 50g as a "hole unit", a lever pivoting restriction unit 50h, and a slit unit 50q are provided. The slit unit 50q is in communication with the through hole 50g, and, as an example, extends radially inward of the driven gear 50 from the through hole 50g. In the present embodiment, the slit unit 50q is set to a size that allows insertion of a foot unit 62h of the rotation restriction unit 62 described later.

Figure 10:
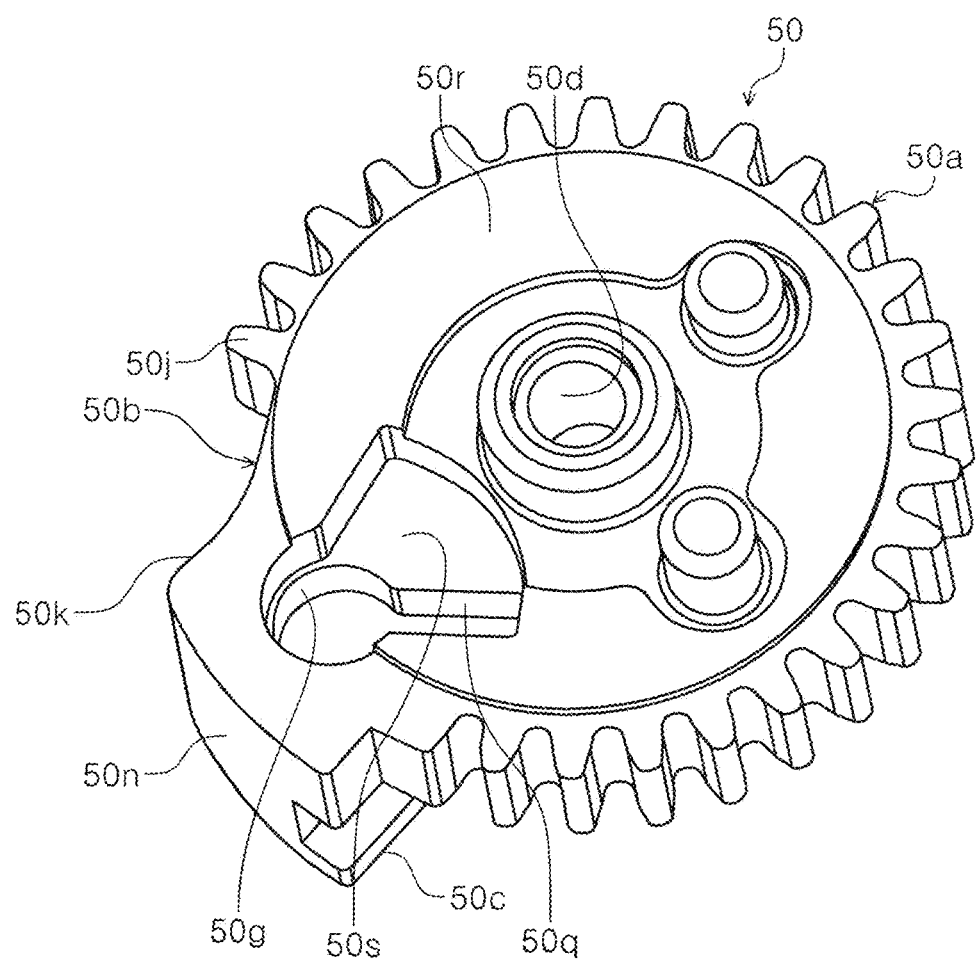
FIG. 10 is a perspective view of the driven gear viewed from a bottom side.

In FIG. 10, a foot-unit accommodation unit 50s is formed on a lower surface 50r of the driven gear 50. The foot-unit accommodation unit 50s communicates with the through hole 50g and the slit unit 50q on the lower surface 50r. The foot-unit accommodation unit 50s is configured to allow pivoting of the foot unit 62h of the rotation restriction unit 62 when the foot unit 62h passed through the slit unit 50q is pivoted around a pivot shaft 62a as center. In the present embodiment, the foot-unit accommodation unit 50s may be formed as a fan-shaped concave unit extending radially inward of the driven gear 50 around the through hole 50g in the lower surface 50r. In the present embodiment, the concave-shaped foot-unit accommodation unit 50s is provided on the lower surface 50r, and thus, the foot unit 62h can be prevented from protruding from the lower surface 50r, and the valve element drive mechanism 30 can be made smaller.

Figure 8:
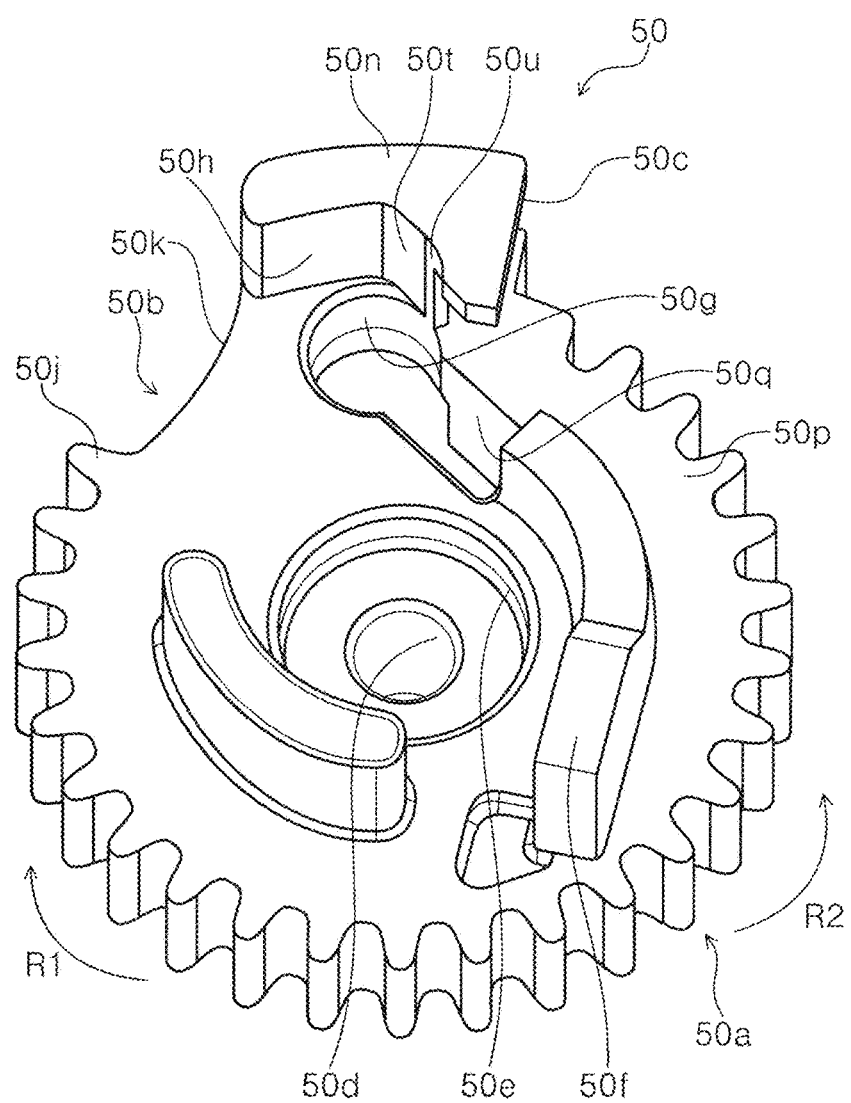
FIG. 8 is a perspective view of a driven gear viewed from an upper side.
Figure 9:
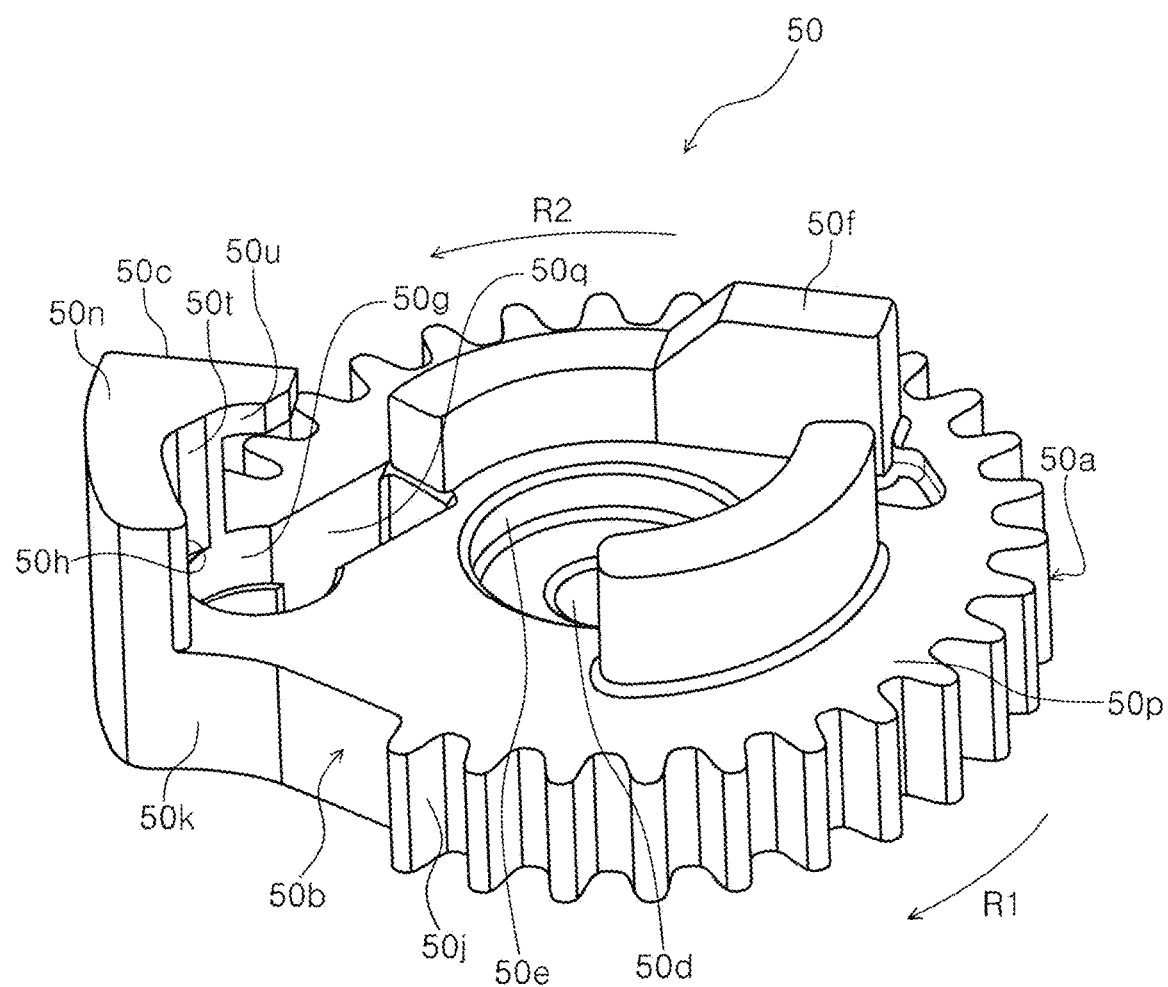
FIG. 9 is a perspective view of the driven gear viewed from an upper side.
Figure 24:
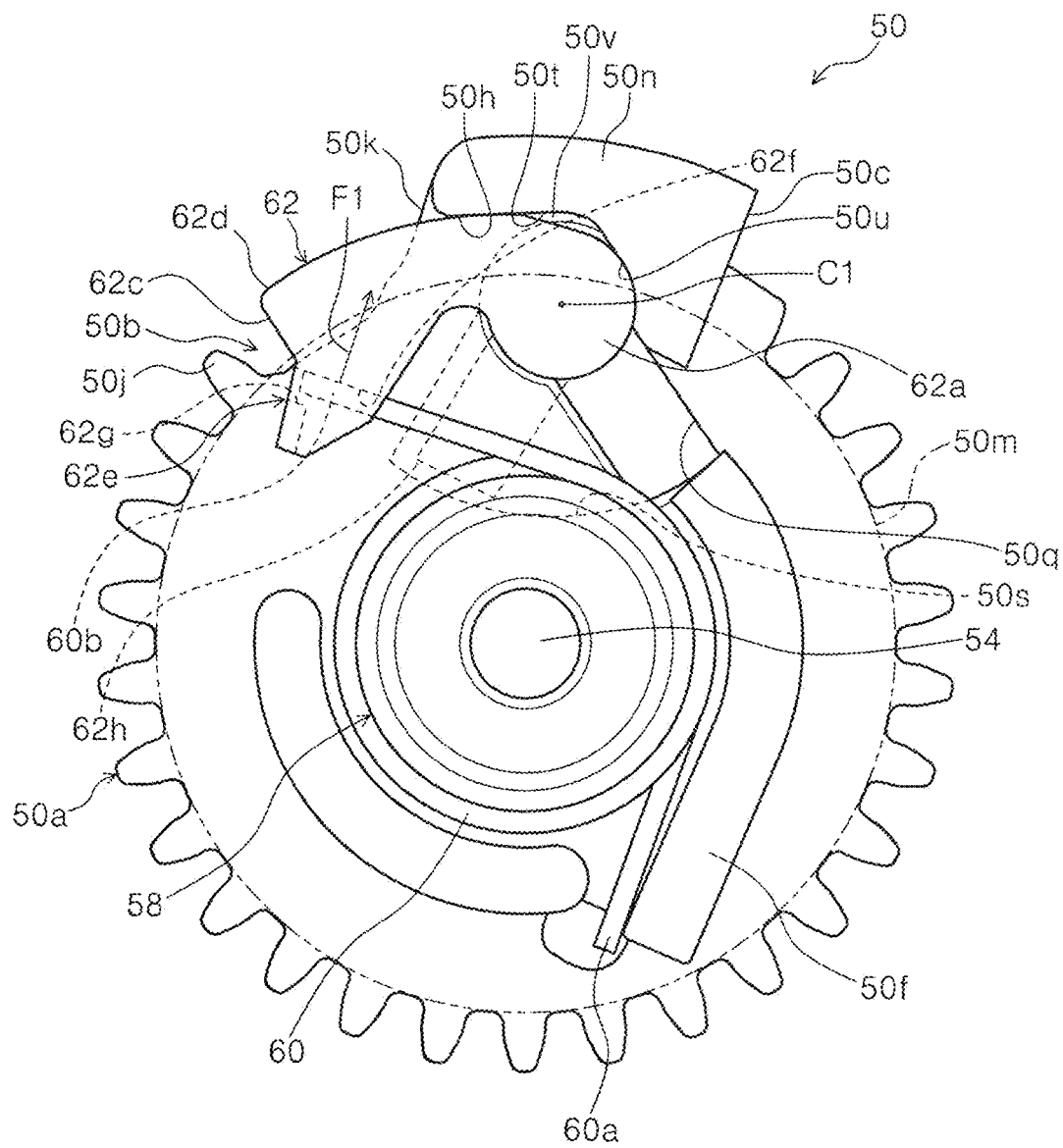
FIG. 24 illustrates a relationship of the center position of a pivot shaft of the rotation restriction unit with respect to the driven gear.

In FIG. 8, FIG. 9, and FIG. 24, the driven gear 50 has a protruding unit 50n protruding upward from the upper surface 50p and protruding radially outward. On one side of the protruding unit 50n in the circumferential direction of the driven gear 50, the first rotation restriction unit 50c is formed; on the other side thereof, the second rotation restriction unit 50k is formed. On the inner side of the protruding unit 50n in the radial direction of the driven gear 50, the lever pivoting restriction unit 50h is formed. In the protruding unit 50n, the lever pivoting restriction unit 50h is formed to be concave radially outward to receive a part of the pivot shaft 62a and a part of a lever unit 62b of the lever-shaped rotation restriction unit 62.

At least a part of the through hole 50g enters a site formed to be concave radially outward in the protruding unit 50n. Here, a circle indicated by a two-dot chain line with reference numeral 50m in FIG. 24 indicates a dedendum circle of the teeth of the meshing unit 50a of the driven gear 50. In the present embodiment, a part of the through hole 50g is located outward of the dedendum circle 50m in the radial direction. Thus, the through hole 50g can be provided in a portion near the outer periphery in the radial direction of the driven gear 50, and the length of the foot unit 62h of the rotation restriction unit 62 described later can be increased.

Further, in the protruding unit 50n, a relief unit 50t is formed on the first direction R1 side of the lever pivoting restriction unit 50h, and a support surface 50u is formed on the first direction R1 side of the relief unit 50t. As illustrated in FIG. 24, the relief unit 50t is shaped to be more recessed radially outward of the driven gear 50 than the lever pivoting restriction unit 50h not to contact the pivot shaft 62a of the rotation restriction unit 62 in the protruding unit 50n. Thus, as illustrated in FIG. 24, in a state where the rotation restriction unit 62 contacts the lever pivoting restriction unit 50h, a gap 50v is formed between the pivot shaft 62a and the relief unit 50t. It is noted that in FIG. 18 to FIG. 21, illustration of the gap 50v is omitted.

As illustrated in FIG. 24, in the present embodiment, the gap 50v is provided to separate the lever pivoting restriction unit 50h from the pivot shaft 62a and to separate a contact position of the lever pivoting restriction unit 50h and a second contact unit 62d of the rotation restriction unit 62 from the pivot shaft 62a.

Here, if the relief unit 50t is not provided, the pivot shaft 62a and the lever pivoting restriction unit 50h contact each other, and a front end position of the lever unit 62b will be unstable in a pivoting direction due to a variation in dimension of the pivot shaft 62a in manufacturing. As a result, a contact position with the convex unit 46b of the driving gear 46 will be unstable, and maintenance of the power non-transmission state in the power transmission switching unit 52 will be unstable. In the present embodiment, there is formed the gap 50v between the relief unit 50t and the pivot shaft 62a, and thus, it is possible to reduce the influence due to the variation in dimension of the pivot shaft 62a in manufacturing to stabilize the front end position of the lever unit 62b.

The support surface 50u is formed as a surface flushing with a part of an inner peripheral surface of the through hole 50g, and extends from the through hole 50g to an upper portion of the protruding unit 50n located above the through hole 50g. Thus, the pivot shaft 62a is supported by the support surface 50u along the axial direction.

(Rotation Restriction Unit)

Figure 11:
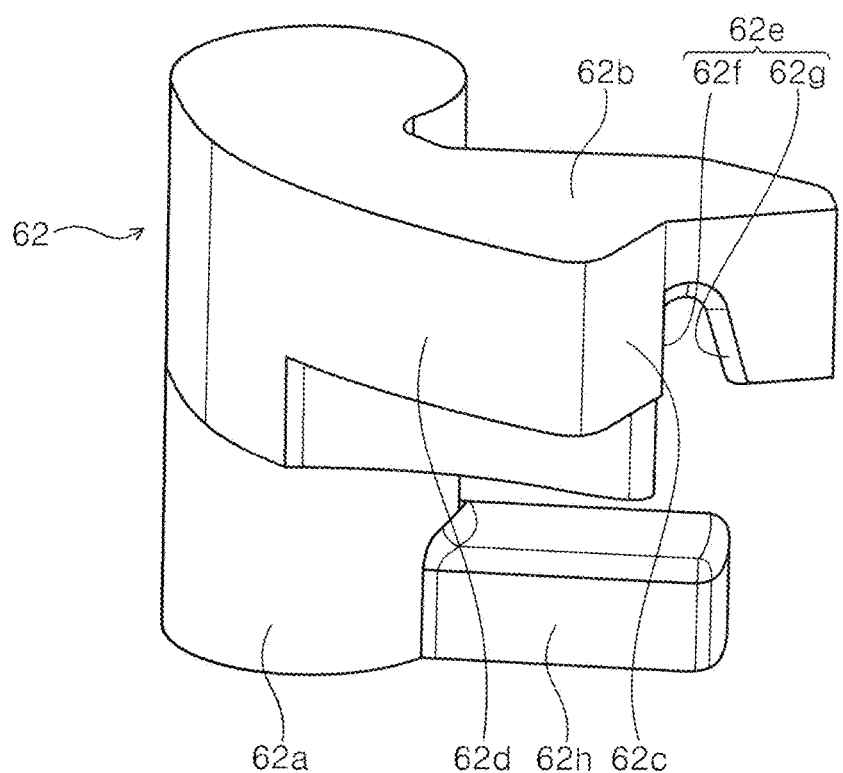
FIG. 11 is a perspective view of a rotation restriction unit.
Figure 12:
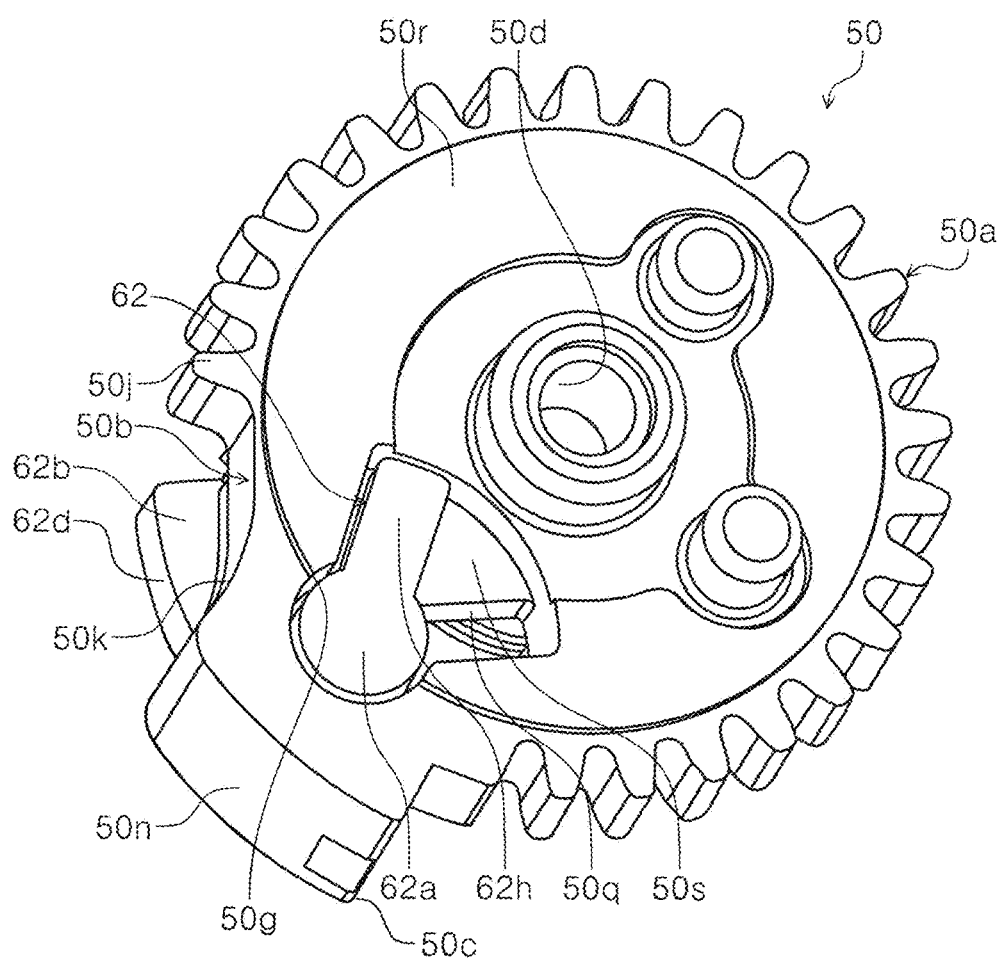
FIG. 12 is a perspective view illustrating a relationship between a foot unit of the rotation restriction unit and a foot-unit accommodation unit of the driven gear.

Referring to FIG. 11, the rotation restriction unit 62 includes the pivot shaft 62a, the lever unit 62b, and the foot unit 62h. A first contact unit 62c, the second contact unit 62d, and a spring holding unit 62e are provided on the lever unit 62b. The spring holding unit 62e includes a spring contact unit 62f as an "urging member contact unit" and a spring detachment prevention unit 62g.

As illustrated in FIG. 4, the rotation restriction unit 62 is pivotably mounted on the driven gear 50. Specifically, the pivot shaft 62a and the foot unit 62h of the rotation restriction unit 62 are inserted into the through hole 50g and the slit unit 50q (FIG. 8) of the driven gear 50. The rotation restriction unit 62 is configured such that the pivot shaft 62a can pivot with respect to the driven gear 50.

A point with reference numeral C1 illustrates a pivoting center of the pivot shaft 62a of the rotation restriction unit 62. In the present embodiment, the rotation restriction unit 62 is attached to the driven gear 50 such that the pivoting center of the pivot shaft 62a is located inside in the radial direction of the dedendum circle 50m of the driven gear 50.

As illustrated in FIG. 11 and FIG. 24, in the present embodiment, the lever unit 62b is provided on one end side in the axial direction of the pivot shaft 62a and the foot unit 62h is provided on the other end side thereof. In the present embodiment, the lever unit 62b is formed as an arc-shaped lever extending from the pivot shaft 62a. When the rotation restriction unit 62 is mounted on the driven gear 50, the second contact unit 62d is formed outside in the radial direction of the driven gear 50 in the lever unit 62b. In the present embodiment, the second contact unit 62d is configured as a curved surface extending along the circumferential direction of the driven gear 50. The first contact unit 62c and the spring holding unit 62e are formed at the front end of the lever unit 62b.

As illustrated in FIG. 24, the spring contact unit 62f of the spring holding unit 62e of the lever unit 62b of the rotation restriction unit 62 is contacted by the other end 60b of the torsion spring 60, and is pressed by the other end 60b of the torsion spring 60. In the spring holding unit 62e, the spring detachment prevention unit 62g is arranged on the opposite side to the spring contact unit 62f with the other end 60b of the torsion spring 60 interposed therebetween. When the other end 60b of the torsion spring 60 in contact with the spring contact unit 62f is separated from the spring contact unit 62f due to a pivoting state of the rotation restriction unit 62, the spring detachment prevention unit 62g prevents the other end 60b of the torsion spring 60 from being detached from the spring holding unit 62e. Thus, the torsion spring 60 can be held with a simple configuration.

In the present embodiment, the spring contact unit 62f is provided at a front end of the lever unit 62b. Here, the urging force of the torsion spring 60 urging the spring contact unit 62f applies a rotational moment in the clockwise direction in FIG. 24 to the rotation restriction unit 62. The amount of this rotational moment is determined depending on the distance from the center C1 of the pivot shaft 62a to the spring contact unit 62f and the urging force of the torsion spring 60. In the present embodiment, the spring contact unit 62f is provided at the front end of the lever unit 62b to obtain a large torque, even if the urging force of the torsion spring 60 is small. Thus, when the lever unit 62b of the rotation restriction unit 62 is separated from the convex unit 46b, the front end of the lever unit 62b can be surely returned, by the urging force of the torsion spring 60, to a position restricted by the lever pivoting restriction unit 50h which is the position before the contact with the convex unit 46b.

In the present embodiment, the rotation restriction unit 62 receives the urging force of the torsion spring 60 such that the second contact unit 62d of the lever unit 62b contacts the lever pivoting restriction unit 50h of the driven gear 50 to press the lever pivoting restriction unit 50h. That is, the lever unit 62b of the rotation restriction unit 62 is urged outward in the radial direction of the driven gear 50 by the urging force of the torsion spring 60, and the pivoting radially outward is restricted at the position where the second contact unit 62d contacts the lever pivoting restriction unit 50h.

On the other hand, when the second contact unit 62d is pressed radially inward of the driven gear 50 against the urging force of the torsion spring 60, the rotation restriction unit 62 pivots radially inward of the driven gear 50 about the pivot shaft 62a. When the pressure radially inward against the second contact unit 62d is released, the lever unit 62b pivots back to the position where the second contact unit 62d contacts the lever pivoting restriction unit 50h by the urging force of the torsion spring 60.

In FIG. 24, an arrow with reference numeral F1 indicates the direction in which the torsion spring 60 urges the spring contact unit 62f. In the present embodiment, the foot unit 62h of the rotation restriction unit 62 extends from the pivot shaft 62a in a direction opposite to the urging direction F1 at the other end 60b of the torsion spring 60. Specifically, the foot unit 62h extends radially inward of the driven gear 50 from the pivot shaft 62a. Here, the direction opposite to the urging direction F1 does not only include a direction obtained by reversing the urging direction F1 by 180 degrees, but also includes a direction including a vector component in the direction opposite to the urging direction F1 as a vector component of the force.

Figure 25:
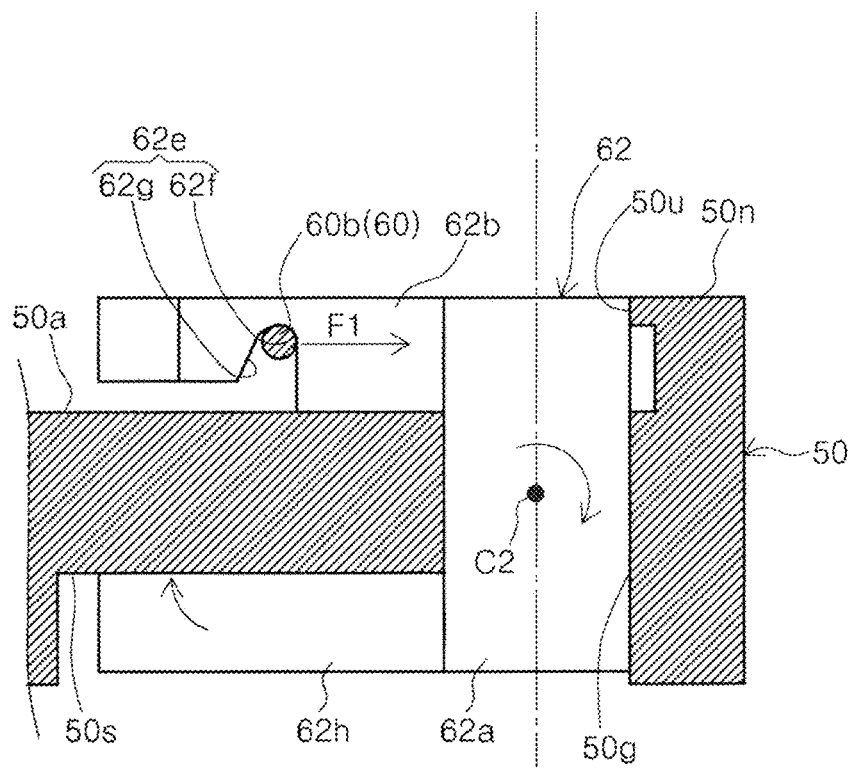
FIG. 25 is a schematic view for describing a relationship between an urging force acting on the rotation restriction unit and the foot unit.

In FIG. 25, when the torsion spring 60 urges the spring contact unit 62f, the rotation restriction unit 62 begins to pivot clockwise in FIG. 25 about the center C2 in the axial direction of the pivot shaft 62a. However, in the present embodiment, when the rotation restriction unit 62 begins to pivot clockwise, the foot unit 62h extending in the direction opposite to the urging direction F1 is pressed again the foot-unit accommodation unit 50s, and thus, collapsing of the pivot shaft 62a is suppressed and pivoting of the rotation restriction unit 62 is restricted. Further, similarly to the foot unit 62h, the support surface 50u also restricts the pivoting of the rotation restriction unit 62, and supports the pivot shaft 62a to restrict collapsing of the pivot shaft 62a in the clockwise direction.

Further, the foot unit 62h is configured to extend radially inward of the driven gear 50 from the pivot shaft 62a, and thus, the length of the foot unit 62h can be made longer compared to a case where the foot unit 62h extends radially outward of the driven gear 50. As a result, it is possible to prevent the pivot shaft 62a from easily collapsing.

(Valve Element)

Figure 7:
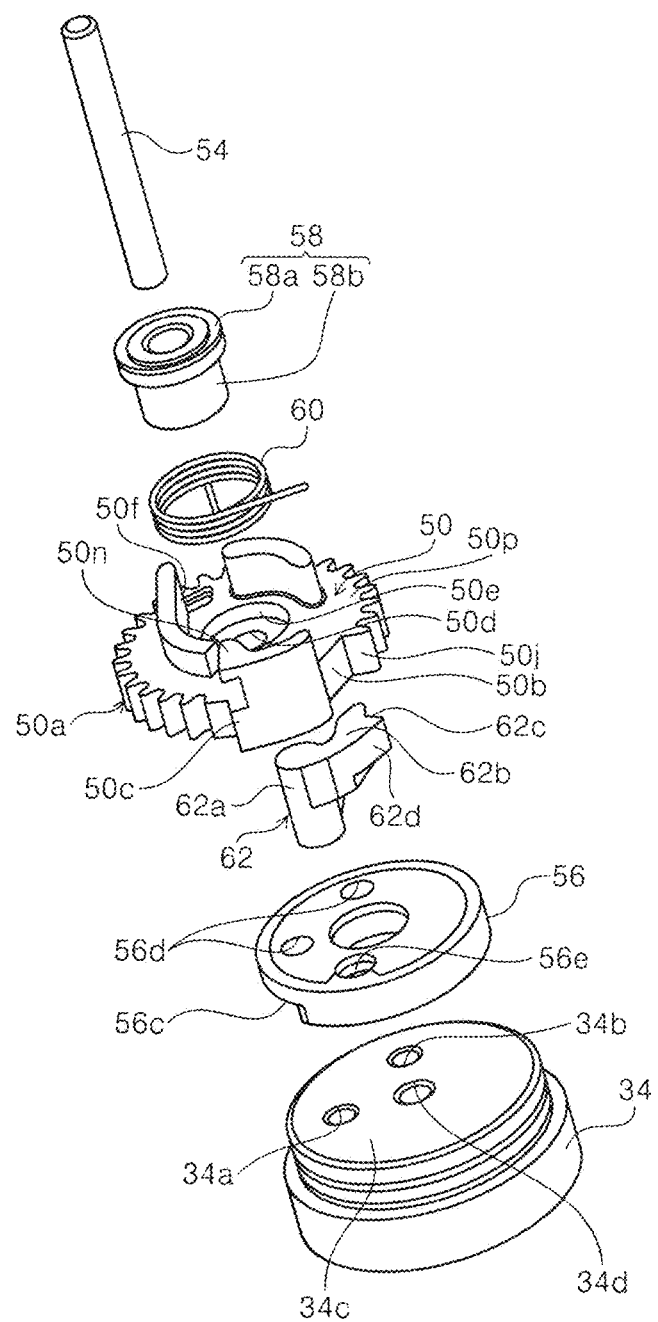
FIG. 7 is an exploded perspective view of a driven portion in the valve element drive mechanism.
Figure 13A:
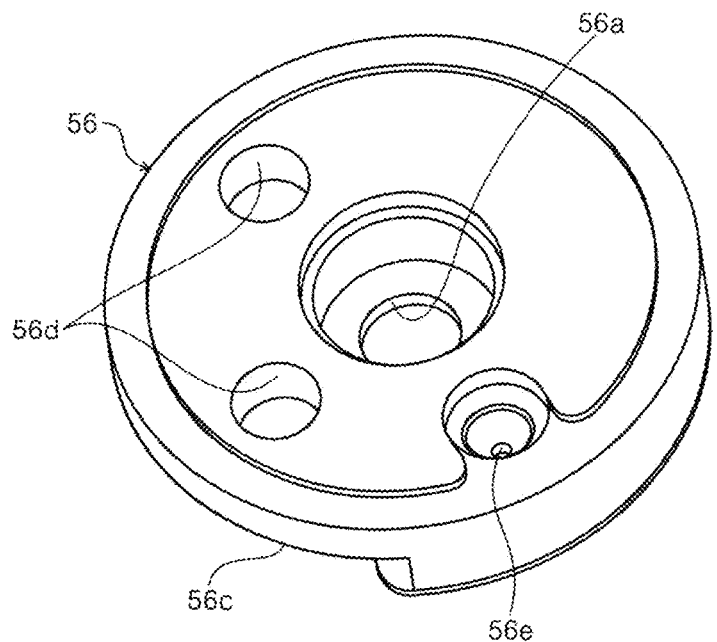
FIG. 13A is a perspective view of the valve element viewed from an opposite side of a valve seat surface.
Figure 13B:
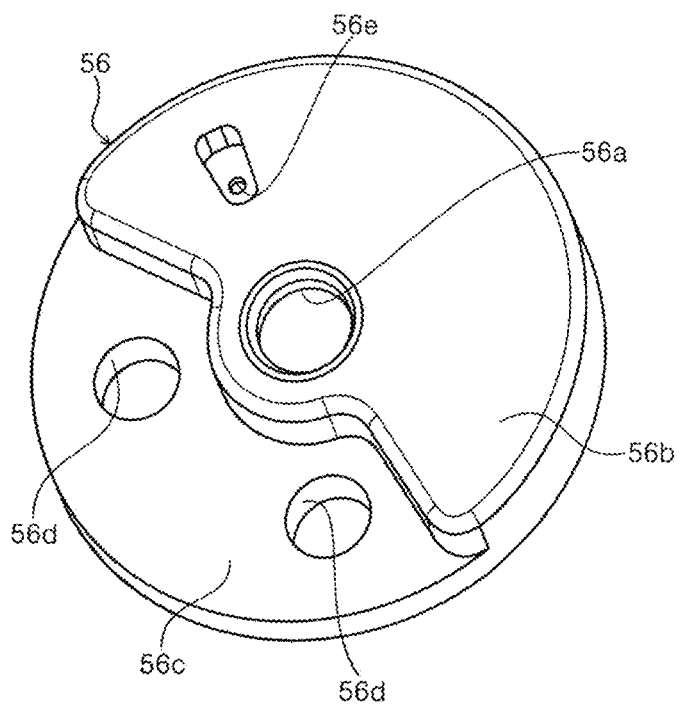
FIG. 13B is a perspective view of the valve element viewed from a seat surface side.

The valve element 56 will be described with reference to FIG. 7, FIG. 13A, and FIG. 13B. As illustrated in FIG. 13A, and FIG. 13B, the valve element 56 is configured as a disc-like member. A through hole 56a is provided at a center of the valve element 56. The spindle 54 is inserted into the through hole 56a. The lower surface of the valve element 56 is configured as a sliding surface 56b sliding on the valve seat surface 34c of the valve seat constitutional member 34. In the valve element 56, a part of the sliding surface 56b is cut away to form a cutout unit 56c.

As illustrated in FIG. 13B, the cutout unit 56c has a shape being recessed upward with respect to the sliding surface 56b of the valve element 56. It is noted that two through holes 56d are arranged in the cutout unit 56c. In the present embodiment, in one configuration as an example, non-illustrated bosses protruding from the lower surface of the driven gear 50 are inserted into the through holes 56d, so that the driven gear 50 and the valve element 56 are integrally rotatable.

Further, there is provided an orifice 56e penetrating in the up-down direction and opening at the sliding surface 56b, on the valve element 56. In the present embodiment, the orifice 56e includes a portion narrower than the first fluid outlet 34a and the second fluid outlet 34b in the fluid path. More preferably, the orifice 56e includes a narrowest portion in the fluid path.

The above is the main configuration of the valve drive device 10 and the valve element drive mechanism 30, and in the following, control of the fluid of the valve element 56 by the valve element drive mechanism 30 and the power transmission state and the power non-transmission state between the driving gear 46 and the driven gear 50 will be described in this order.

(Fluid Control by Valve Element)

Flow rate control of fluid from the fluid inlet 28b to at least one of the first fluid outlet 34a and the second fluid outlet 34b will be described with reference to FIG. 14 to FIG. 17. In step S0 of FIG. 15, the driving gear 46 is located at the origin position with respect to the driven gear 50. A relationship between the teeth of the driving gear 46 and the teeth of the driven gear 50 at the origin position will be described later.

As illustrated in FIG. 15, in step S0 (origin position), the cutout unit 56c of the valve element 56 is located above the first fluid outlet 34a and the second fluid outlet 34b. Accordingly, since the valve element 56 does not close the first fluid outlet 34a and the second fluid outlet 34b, the first fluid outlet 34a and the second fluid outlet 34b are in the opened state. Thus, the fluid supplied from the fluid inlet 28b into the valve chamber 32 flows out to the first outflow pipe 16 and the second outflow pipe 18 through the first fluid outlet 34a and the second fluid outlet 34b (see an opening/closing mode of FIG. 14).

Then, the motor 24 is rotationally driven to rotate the rotor 40, and hence the driving gear 46, in the first direction R1. At this time, the driven gear 50 meshing with the driving gear 46 is also driven to rotate (in the clockwise direction in FIG. 15) and shifts to the state of step Si (the central diagram in FIG. 15). The driven rotation of the driven gear 50 causes the valve element 56 to slide against the valve seat constitutional member 34 in the clockwise direction in FIG. 15 with the sliding surface 56b in close contact with the valve seat surface 34c. Also in step S1, since the cutout unit 56c is located above the first fluid outlet 34a and the second fluid outlet 34b, the first fluid outlet 34a and the second fluid outlet 34b are in the open state, that is, in the opening mode in FIG. 14.

As illustrated in the lower diagram of FIG. 15, when the driving gear 46 is further rotated in the first direction R1, the state of step S1 is shifted to the state of step S2. In this state, the orifice 56e is located above the first fluid outlet 34a, and the cutout unit 56c is located above the second fluid outlet 34b. The first fluid outlet 34a is in a state where the flow rate of the fluid flowing out from the first fluid outlet 34a is restricted by the orifice 56e.

That is, the flow rate of the fluid flowing out from the first fluid outlet 34a restricted by the orifice 56e is lower than the flow rate of the fluid flowing out from the first fluid outlet 34a in the completely opened state as in steps S0 and S1. That is, a slight opening mode is obtained in step S2 of FIG. 14. The second fluid outlet 34b is in the opened state, and thus, is in the opening mode.

Figure 16:
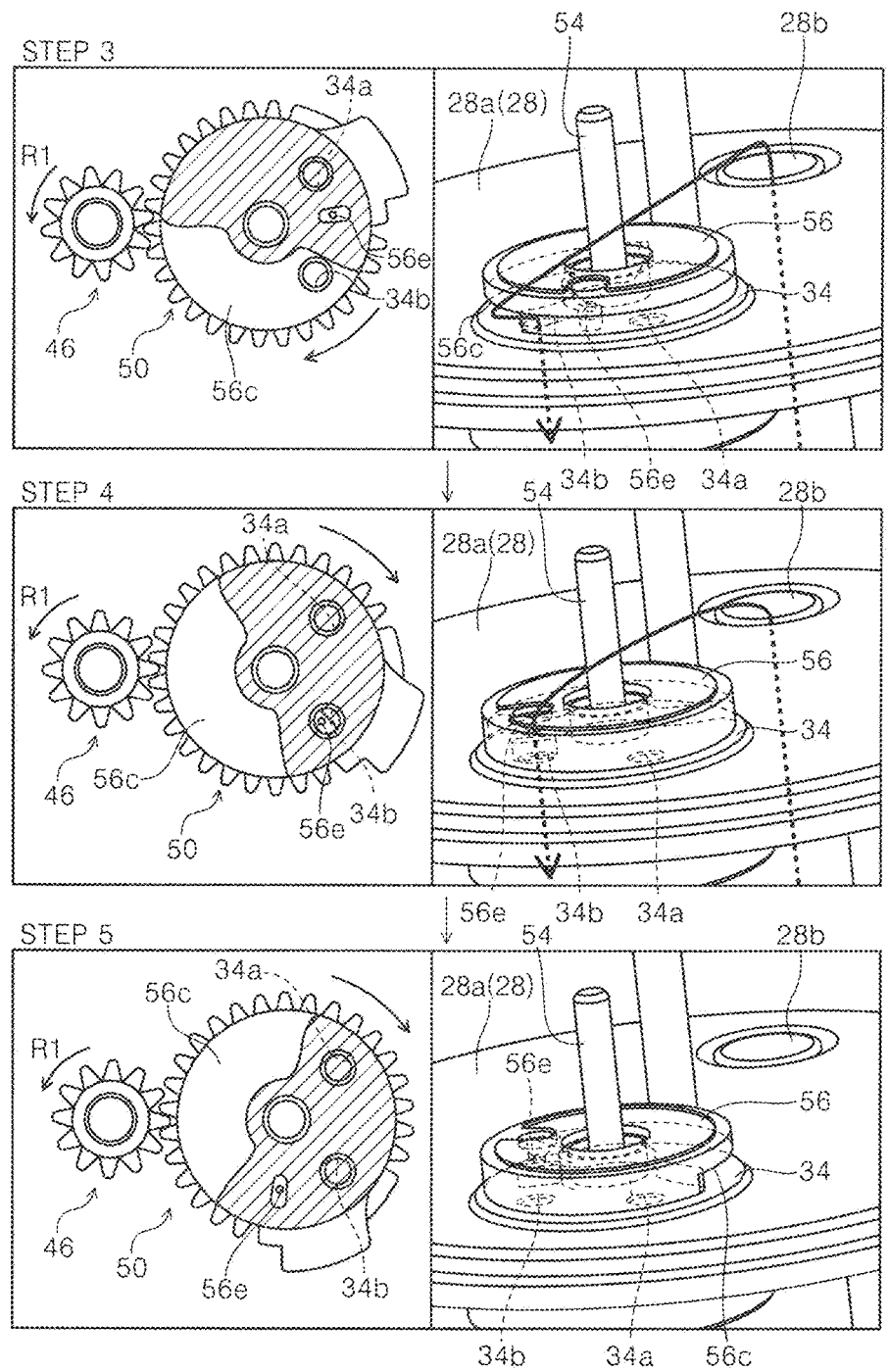
FIG. 16 illustrates phase states of the output gear and the driven gear and a state of the valve element.

Next, as illustrated in the upper diagram in FIG. 16, when the driving gear 46 is further rotated in the first direction R1, the state of step S2 is shifted to the state of step S3. In this state, the orifice 56e is displaced from the position above the first fluid outlet 34a. The first fluid outlet 34a is covered with and closed by the sliding surface 56b of the valve element 56. Accordingly, the first fluid outlet 34a is in the closing mode (FIG. 14), and the path of fluid from the valve chamber 32 to the first outflow pipe 16 is blocked. On the other hand, the cutout unit 56c is located above the second fluid outlet 34b. Accordingly, the second fluid outlet 34b is open, and thus, is in the opening mode (FIG. 14).

Then, as illustrated in the central diagram of FIG. 16, when the driving gear 46 is further rotated in the first direction R1, the state of step S3 is shifted to the state of step S4. In this state, the first fluid outlet 34a is covered with and closed by the sliding surface 56b of the valve element 56. Accordingly, the first fluid outlet 34a maintains the state of the closing mode (FIG. 14) continuously from step S3, and the state where the path of fluid from the valve chamber 32 to the first outflow pipe 16 is blocked is maintained.

Further, the orifice 56e is located above the second fluid outlet 34b. Accordingly, the second fluid outlet 34b is in a state where the flow rate of the fluid flowing out from the second fluid outlet 34b is restricted by the orifice 56e, that is, is in the slight opening mode in step S4 of FIG. 14.

Next, as illustrated in the lower diagram of FIG. 16, when the driving gear 46 is further rotated in the first direction R1, the state of step S4 is shifted to the state of step S5. In the state of step S5, the first fluid outlet 34a and the second fluid outlet 34b are covered with the sliding surface 56b of the valve element 56 to be in the closed state. That is, the closing mode is obtained in step S5 of FIG. 14. In this state, the path of fluid from the valve chamber 32 to the first outflow pipe 16 and the second outflow pipe 18 is blocked.

Figure 17:
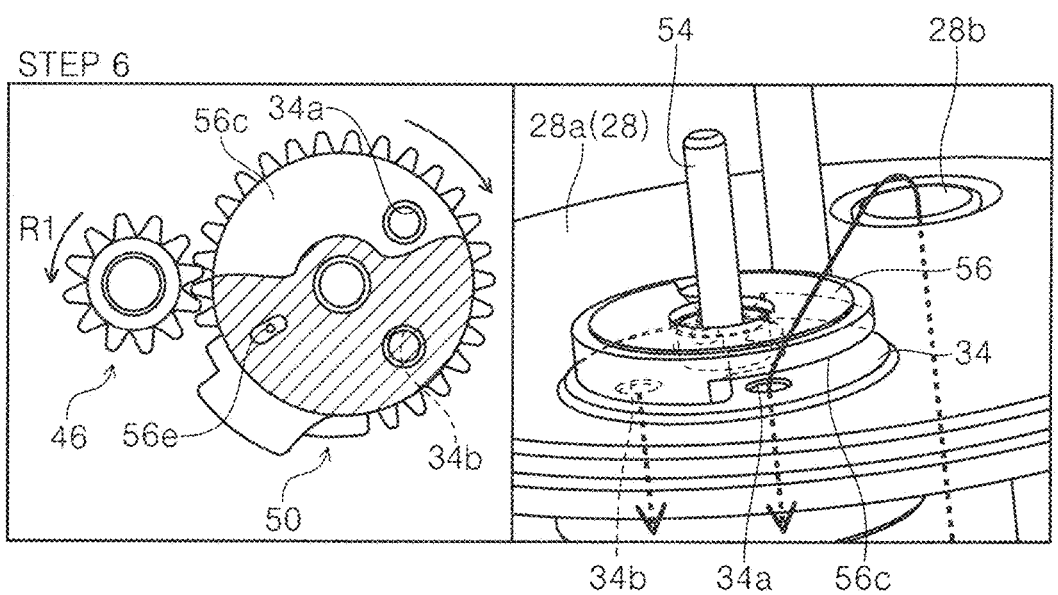
FIG. 17 illustrates phase states of the output gear and the driven gear and a state of the valve element.

Next, as illustrated in FIG. 17, when the driving gear 46 is further rotated in the first direction R1, the state of step S5 is shifted to the state of step S6. In the state of step S6, the cutout unit 56c is again located above the first fluid outlet 34a. Accordingly, the first fluid outlet 34a is completely open, and is in the opening mode in FIG. 14. On the other hand, the second fluid outlet 34b maintains the closed state where the second fluid outlet 34b is covered with the sliding surface 56b of the valve element 56, and thus, the state where the path of fluid from the valve chamber 32 to the second outflow pipe 18 is blocked is maintained. That is, the closing mode is obtained in step S6 of FIG. 14.

In the present embodiment, the valve element 56 is rotated with respect to the valve seat constitutional member 34 by the motor 24 so that each of the first fluid outlet 34a and the second fluid outlet 34b can be switched to the opened state, the slightly opened state, or the closed state, and thus, the flow rate of the fluid flowing out from the valve chamber 32 to each of the first outflow pipe 16 and the second outflow pipe 18 can be adjusted.

(Switching from Power Transmission State to Power Non-Transmission State in Power Transmission Switching Unit)

Figure 19:
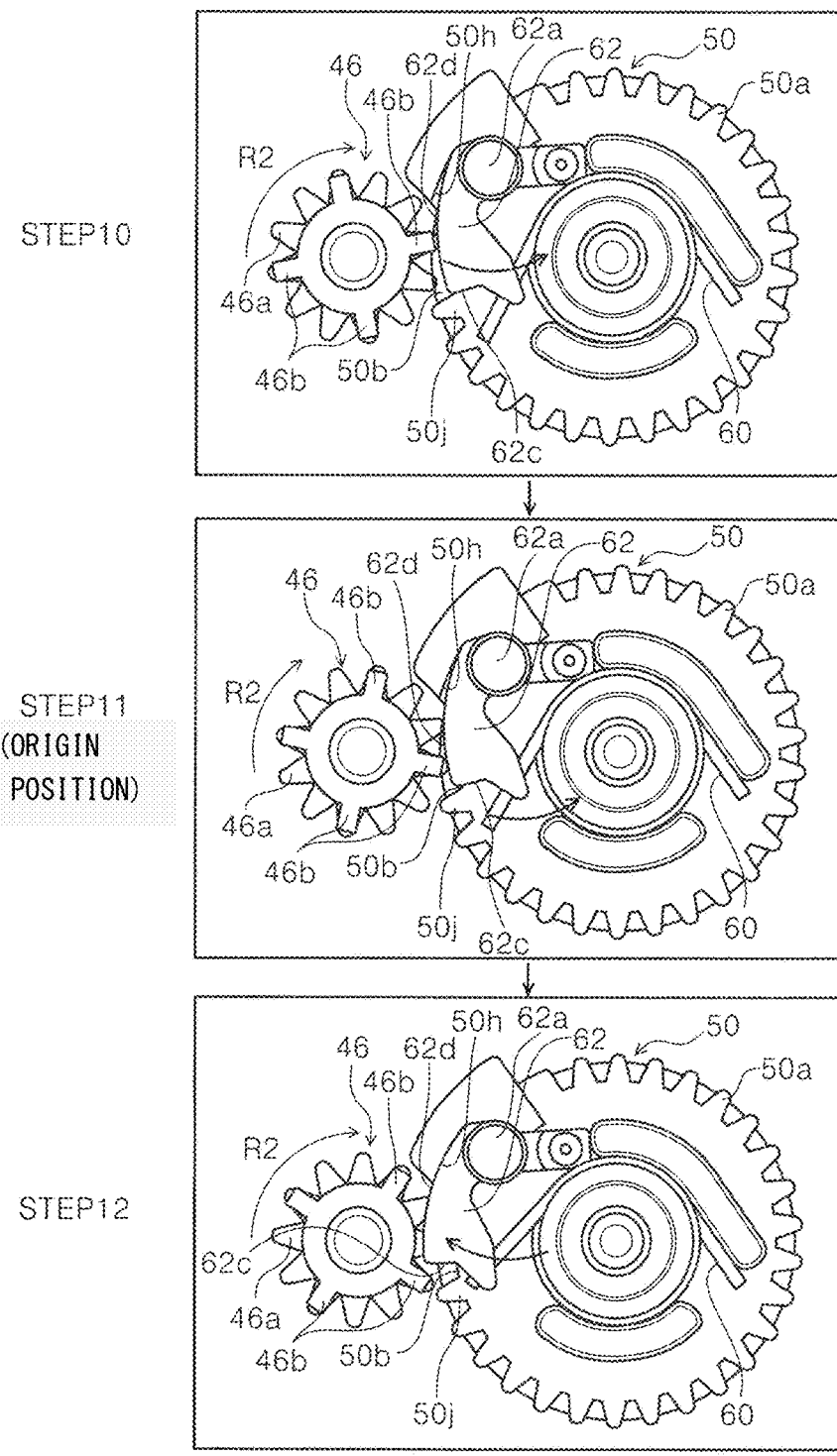
FIG. 19 illustrates a state of the valve element drive mechanism in the origin returning operation.

Next, an origin position returning operation of the power transmission switching unit 52 of the valve element drive mechanism 30 will be described with reference to FIG. 18 and FIG. 19. In step S7, the driving gear 46 rotates in the second direction R2. In the state of step S7, the gear unit 46a of the driving gear 46 meshes with the meshing unit 50a of the driven gear 50. It is noted that, in step S7, after rotating the driving gear 46 in the first direction R1 so that the driven gear 50 is driven to rotate, the rotation direction is switched to the second direction side and a state on the way of returning to the origin position is obtained.

When the state is further shifted from step S7 to step S8, the driving gear 46 returns to the origin position with respect to the driven gear 50. Here, the origin position indicates a state where the meshing state between the gear unit 46a of the driving gear 46 and the meshing unit 50a of the driven gear 50 is released, and the gear unit 46a is located within the non-meshing unit 50b of the driven gear 50. In this state, if the driving gear 46 rotates in the second direction, the power non-transmission state is obtained where the power is not transmitted from the driving gear 46 to the driven gear 50.

Specifically, referring to the diagrams of steps S7 to 12, when the driving gear 46 rotates in the second direction R2, the four convex units 46b also rotate in the second direction R2. When proceeding from steps S7 to S9, the convex unit 46b facing the second contact unit 62d of the rotation restriction unit 62 approaches the second contact unit 62d while rotating in the second direction R2, and finally contacts the second contact unit 62d in step S9.

When the driving gear 46 further rotates in the second direction R2, the convex unit 46b in contact with the second contact unit 62d also begins to rotate in the second direction R2. At this time, the convex unit 46b presses the second contact unit 62d against the urging force of the torsion spring 60 as illustrated in steps S10 and S11. As a result, the rotation restriction unit 62 pivots radially inward of the driven gear 50 about the pivot shaft 62a.

Afterwards, as illustrated in steps S11 and S12, when the driving gear 46 further rotates in the second direction R2, the convex unit 46b which has pressed the second contact unit 62d is separated from the second contact unit 62d. As a result, the rotation restriction unit 62 pivots radially outward by the urging force of the torsion spring 60, and pivots to a position where the second contact unit 62d contacts the lever pivoting restriction unit 50h of the driven gear 50.

In the present embodiment, when the driving gear 46 is rotated in the second direction R2 in a state where the gear unit 46a of the driving gear 46 is located within the non-meshing unit 50b of the driven gear 50, the gear unit 46a continues to rotate idly in the non-meshing unit 50b while the convex unit 46b intermittently repeats contact with and separation from the second contact unit 62d of the rotation restriction unit 62. Therefore, it is possible to prevent inadvertent contact between the tooth of the driving gear 46 and the tooth of the driven gear 50 in the power non-transmission state, and to prevent the generation of a collision noise when the teeth collide.

When the gear unit 46a continuously rotates idly in the non-meshing unit 50b, the state continues where the meshing state between the gear unit 46a of the driving gear 46 and the meshing unit 50a of the driven gear 50 is released. As a result, the power non-transmission state where the power of the motor 24 is not transmitted from the driving gear 46 to the driven gear 50 is maintained. Therefore, the possibility of a step-out occurring in the motor 24 can be reduced, and thus, noise caused by the step-out can be suppressed.

(Second Rotation Restriction Unit)

Figure 23A:
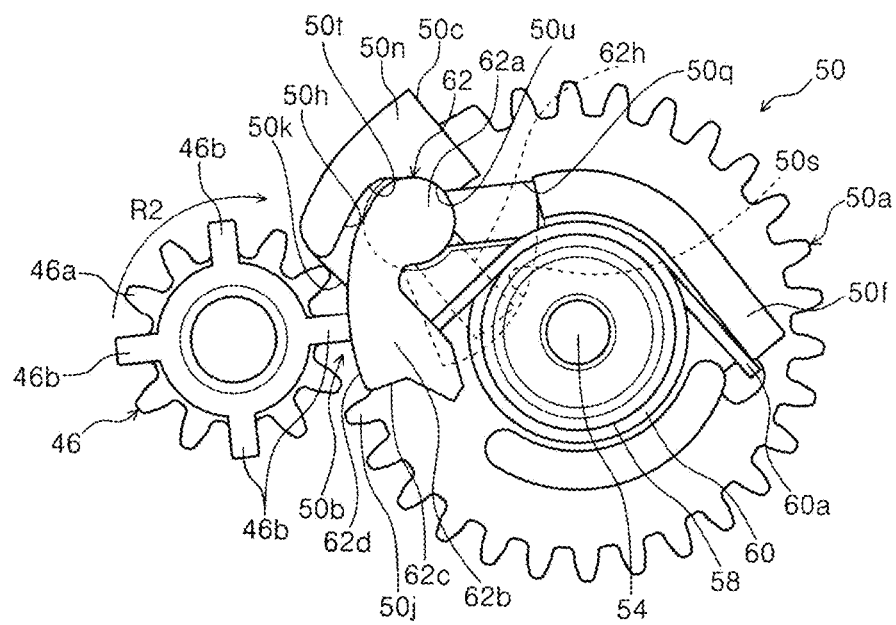
FIG. 23A and FIG. 23B illustrate a state where the co-rotation of the driven gear with respect to a driving gear is restricted by a second rotation restriction unit.
Figure 23B:
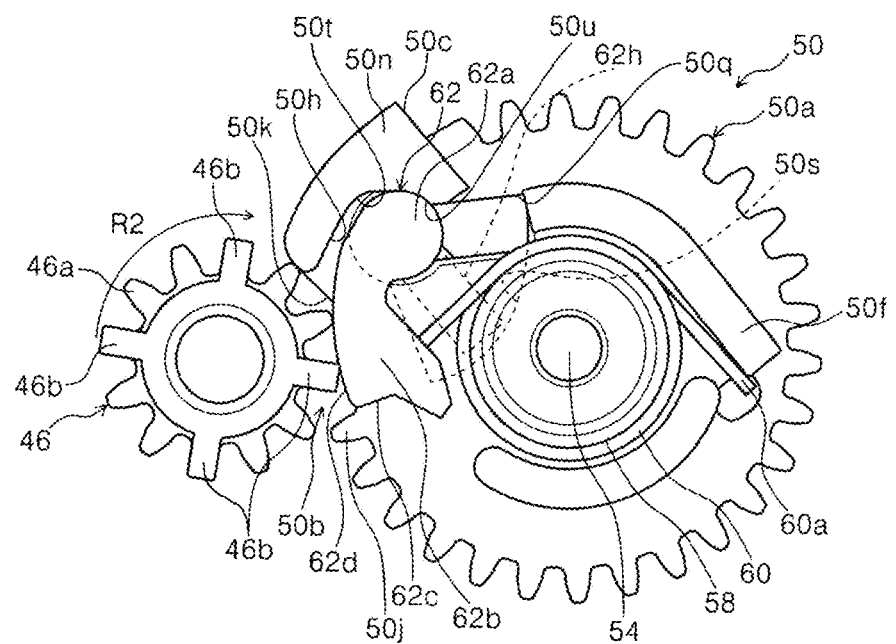

The second rotation restriction unit 50k will be described with reference to FIG. 23A and FIG. 23B. FIG. 23A and FIG. 23B illustrate the relationship between the driving gear 46 and the driven gear 50 from step S10 to step S11. In FIG. 23A, when the convex unit 46b contacts the second contact unit 62d of the rotation restriction unit 62 to press the second contact unit 62d, the convex unit 46b rotates in the second direction R2, and thus, presses the second contact unit 62d such that the second contact unit 62d rotates in the counterclockwise direction in FIG. 23A.

Here, the second contact unit 62d pressed by the convex unit 46b tries to rotate, together with the driven gear 50, in the counterclockwise direction in FIG. 23A and FIG. 23B. In the present embodiment, in the driven gear 50, the second rotation restriction unit 50k is arranged on the first direction R1 side of the non-meshing unit 50b. When the driven gear 50 rotates together with the second contact unit 62d in the counterclockwise direction in FIG. 23A, the second rotation restriction unit 50k contacts the gear of the gear unit 46a of the driving gear 46 located in the non-meshing unit 50b (FIG. 23A).

When the second rotation restriction unit 50k contacts the tooth of the gear unit 46a, the counterclockwise rotation of the driven gear 50 in FIG. 23A and FIG. 23B is restricted. Further, even when the driving gear 46 continues to rotate in the second direction R2 in this state, the state where the second rotation restriction unit 50k contacts one of the teeth of the gear unit 46a (FIG. 23B) is maintained, and thus, the rotation-restricted state of the driven gear 50 is maintained. Thus, the gear unit 46a of the driving gear 46 can rotate idly in the non-meshing unit 50b, and the power non-transmission state can be maintained.

(Second Contact Unit)

Figure 26A:
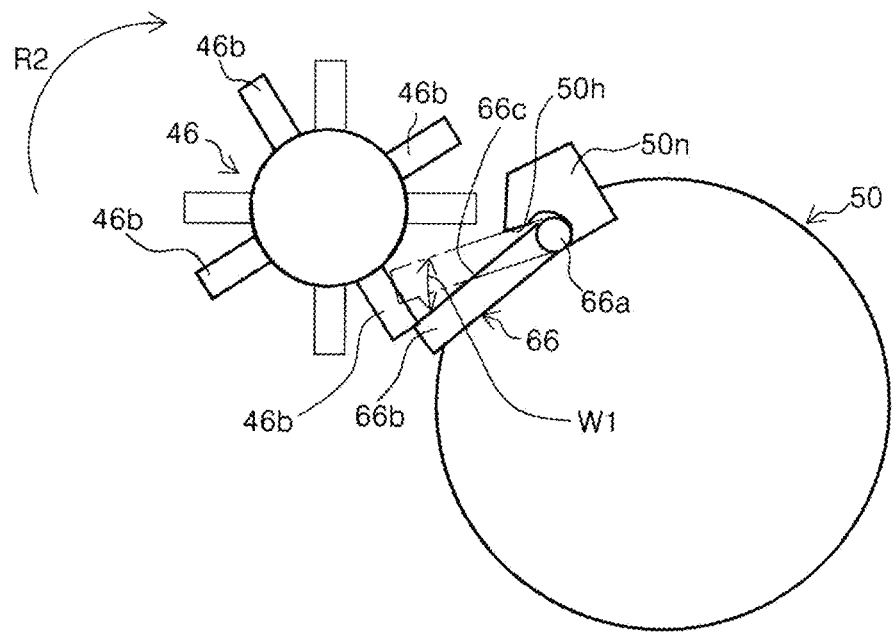
FIG. 26A and FIG. 26B are schematic views for describing an effect of configuring a second contact unit of a lever unit as a curved surface.

Further, with reference to FIG. 26A and FIG. 26B, an advantage obtained by configuring the second contact unit 62d as a curved surface will be described. FIG. 26A illustrates a rotation restriction unit 66 in which the second contact unit is formed in a linear shape. The rotation restriction unit 66 includes a pivot shaft 66a, a lever unit 66b, and a second contact unit 66c. FIG. 26A illustrates a displacement of a pivoting state of the rotation restriction unit 66 including the linear lever unit 66b, and FIG. 26B illustrates a displacement of a pivoting state of the rotation restriction unit 62 according to the present embodiment.

In FIG. 26A, the linear second contact unit 66c pivots radially inward of the driven gear 50 when contacting the convex unit 46b. The convex unit 46b in contact with the second contact unit 66c pivots in the second direction R2 along the linear second contact unit 66c. At this time, the linear second contact unit 66c is pushed radially inward of the driven gear 50 until immediately before separating from the convex unit 46b. When the convex unit 46b is separated from the second contact unit 66c, the rotation restriction unit 66 pivots, by the urging force of the non-illustrated torsion spring 60, by a pivoting amount W1, to a position where the second contact unit 66c contacts the lever pivoting restriction unit 50h. It is noted that a two-dot chain line in FIG. 26A schematically illustrates the second contact unit 66c in contact with the lever pivoting restriction unit 50h and the position of the convex unit 46b in this state.

Figure 26B:
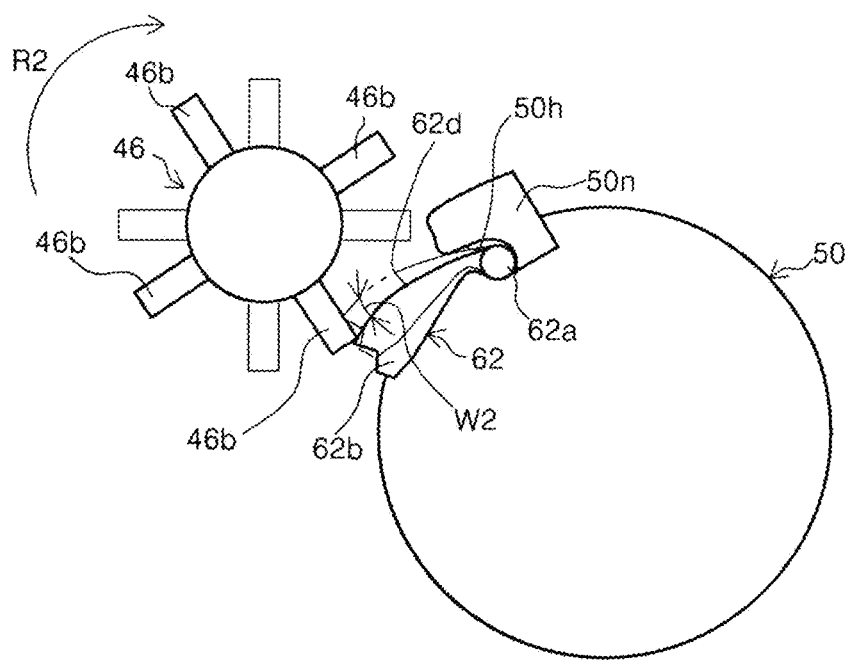

On the other hand, in FIG. 26B, if the second contact unit 62d configured as a curved surface contacts the convex unit 46b, the second contact unit 62d is pivoted radially inward of the driven gear 50. If the driving gear 46 pivots in the second direction R2, the convex unit 46b moves while sliding with the second contact unit 62d. At this time, since the second contact unit 62d is a curved surface along the circumferential direction of the driven gear 50, along with the pivoting of the convex unit 46b in the second direction R2, the second contact unit 62d returns gradually radially outward from the state where the second contact unit 62d is pushed radially inward of the driven gear 50. Then, if the convex unit 46b is separated from the second contact unit 62d, the second contact unit 62d returns by a pivoting amount W2 to a position where the second contact unit 62d contacts the lever pivoting restriction unit 50h. A two-dot chain line in FIG. 26B schematically illustrates the second contact unit 62d in contact with the lever pivoting restriction unit 50h and the position of the convex unit 46b in this state.

Here, the rotation restriction unit 62 starts pivoting radially outward from the state before the convex unit 46b is separated from the second contact unit 62d, and thus, the amount W2 of pivoting radially outward obtained when the convex unit 46b is separated from the second contact unit 62d, can be made smaller than the pivoting amount W1 of the rotation restriction unit 66. As a result, the impact generated when the second contact unit 62d contacts the lever pivoting restriction unit 50h can be mitigated, and the impact sound (noise) can be suppressed.

(Switching from Power Non-Transmission State to Power Transmission State)

Next, switching from the power non-transmission state to the power transmission state will be described with reference to FIG. 20 and FIG. 21. In the present embodiment, as illustrated in step S13, in the state where the gear unit 46a of the driving gear 46 is positioned within the non-meshing unit 50b of the driven gear 50, that is, in the power non-transmission state, the driving gear 46 is set to the origin position. It is noted that positioning of the driving gear 46 in the origin position is performed by exciting the stator 36 with a predetermined excitation pattern.

Figure 20:
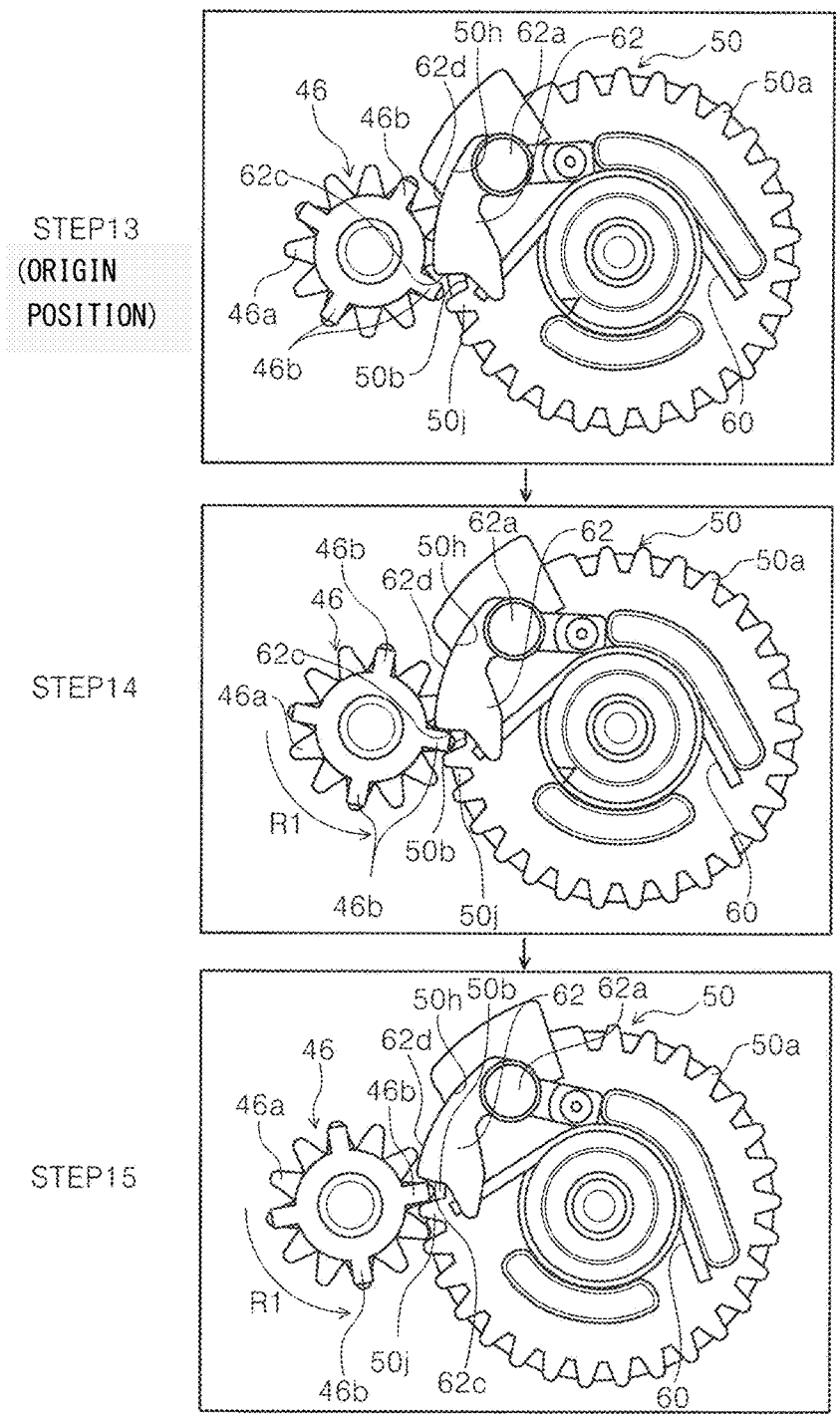
FIG. 20 illustrates a state of the valve element drive mechanism during driving the valve element.

When the driving gear 46 starts rotating in the first direction R1 in step S14, the convex unit 46b contacts the first contact unit 62c of the rotation restriction unit 62, and presses the rotation restriction unit 62, and hence the driven gear 50 in the clockwise direction in FIG. 20. Here, since the convex unit 46b in contact with the first contact unit 62c presses the first contact unit 62c toward the pivot shaft 62a in the direction intersecting the first contact unit 62c, the rotation restriction unit 62 cannot pivot. As a result, the driven gear 50 is pressed by the convex unit 46b via the first contact unit 62c of the rotation restriction unit 62 and rotates in the clockwise direction in FIG. 20.

As a result, as illustrated in step S15, the teeth of the gear unit 46a of the driving gear 46 leave the non-meshing unit 50b of the driven gear 50 to start meshing with the teeth of the meshing unit 50a. Thus, the power transmission switching unit 52 switches from the power non-transmission state to the power transmission state. Further, when the driving gear 46 pivots in the first direction R1, the driven gear 50 continues to pivot in the clockwise direction in FIG. 21, by meshing between the teeth of the gear unit 46a and the teeth of the meshing unit 50a, as illustrated in step S16.

Figure 21:
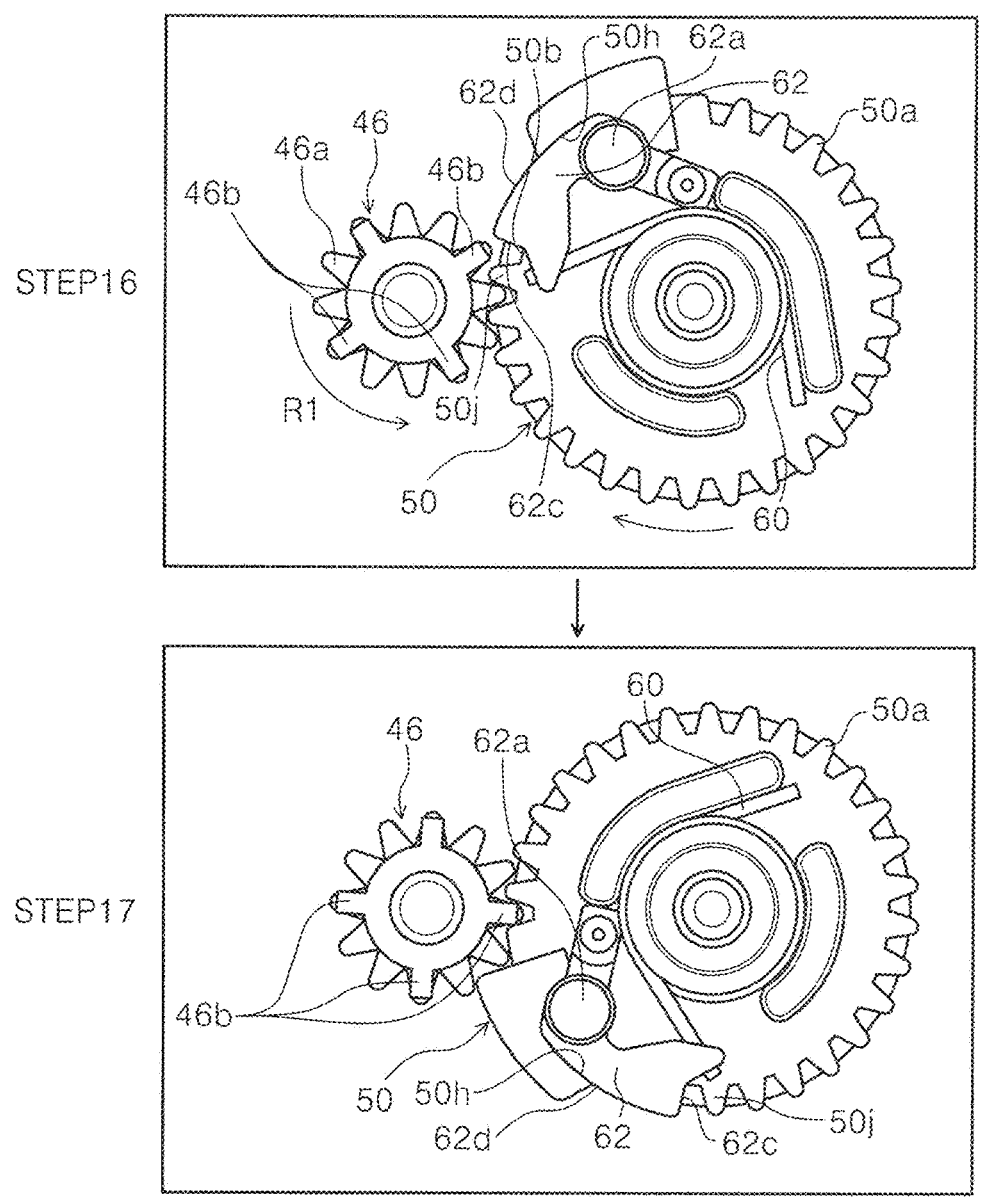
FIG. 21 illustrates a state of the valve element drive mechanism during driving the valve element.

Further, as illustrated in step S17, by rotating the driving gear 46 in the first direction R1, the driven gear 50 can be rotated in the clockwise direction in FIG. 21, and thus, the operations in the valve element 56 from steps S1 to S6 can be performed.

Next, the relationship between the driving gear 46 and the driven gear 50 at the origin position (in the state of step S13 in FIG. 20) will be described with reference to FIG. 22. In the present embodiment, when the driving gear 46 is located at the origin position, the convex unit 46b is located at a position corresponding to the first contact unit 62c of the rotation restriction unit 62. Here, the lock avoidance tooth 46c is formed at a position corresponding to the convex unit 46b in the circumferential direction of the driving gear 46.

Figure 22:
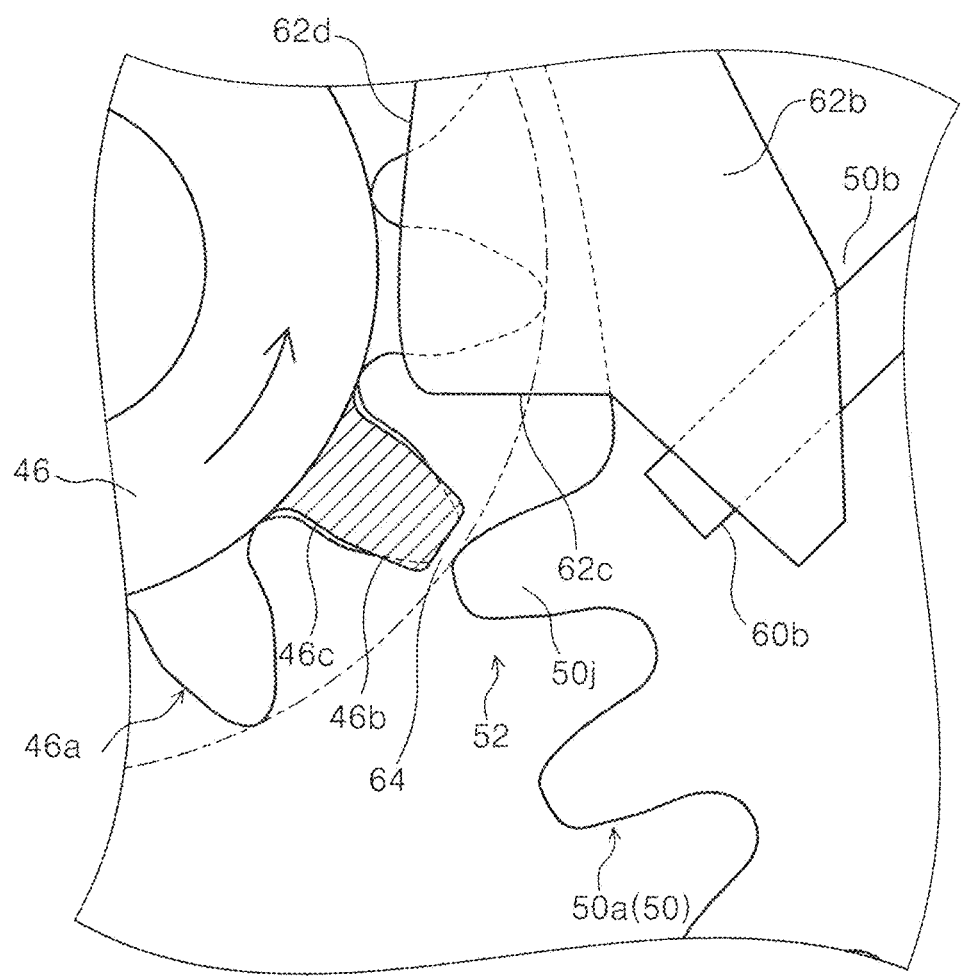
FIG. 22 illustrates a relationship between the output gear and the driven gear at an origin position.

In FIG. 22, a circular arc indicated by a dot-dashed line illustrates an addendum circle of the teeth other than the lock avoidance tooth 46c in the gear unit 46a of the driving gear 46. In FIG. 22, in the state where the driving gear 46 is located at the origin position, a tooth 50j at the boundary between the meshing unit 50a and the non-meshing unit 50b of the driven gear 50 is located at a position to interfere with an addendum circle of the teeth other than the lock avoidance tooth 46c.

In this state, when the driving gear 46 is to rotate in the first direction in the state where a tooth other than the lock avoidance tooth 46c is arranged at the position of the lock avoidance tooth 46c, the tooth 50j of the driven gear 50 and the tooth being located at the position of the lock avoidance tooth 46c and being the tooth other than the lock avoidance tooth 46c may contact each other, which results in a locked state of the driving gear 46 and the driven gear 50.

In the present embodiment, when the driving gear 46 is located at the origin position, the lock avoidance tooth 46c of the driving gear 46 is arranged close to the tooth 50j of the driven gear 50. Thus, since the addendum circle of the lock avoidance tooth 46c is smaller than the addendum circle of the teeth other than the lock avoidance tooth 46c, a gap 64 can be formed between the tooth 50j of the driven gear 50 and the lock avoidance tooth 46c of the driving gear 46. The gap 64 is formed to avoid the locked state between the driving gear 46 and the driven gear 50. As a result, in the power transmission switching unit 52, switching from the power non-transmission state to the power transmission state between the driving gear 46 and the driven gear 50 can be smoothly performed, and thus, the occurrence of abnormal operation (displacement of the gear unit 46a of the driving gear 46 with respect to the excitation pattern) and operation failure can be suppressed.

As described above, in the present embodiment, the rotation restriction unit 62 in the power transmission switching unit 52 is configured to allow rotation of the driven gear 50 when the driving gear 46 rotates in the first direction, and to restrict the rotation of the driven gear 50 when the driving gear 46 rotates in the second direction. That is, the rotation restriction unit 62 is configured as a clutch mechanism. The configuration of a known clutch mechanism is utilized for the rotation restriction unit 62 in the present embodiment to reduce the design time and the costs.

The rotation restriction unit 62 in the present embodiment transmits power from the driving gear 46 to the driven gear 50 when the driving gear 46 rotates in the first direction, and cuts off the power transmission from the driving gear 46 to the driven gear 50 when the driving gear 46 rotates in the second direction, thus, the power transmission state can be switched by solely switching the rotation direction of the driving gear 46, and therefore, the configuration of the rotation restriction unit 62 can be simplified.

Modification of Embodiment (1) In the present embodiment, the configuration is employed where the rotation restriction unit 62 is urged by the torsion spring 60 as an example of the "urging member". However, instead of this configuration, the urging member may be configured by a plate spring or the like.

(2) In the present embodiment, a configuration may be employed where the power transmission switching unit 52 switches the power transmission by switching the engagement state between the convex unit 46b and the rotation restriction unit 62 (contact between the convex unit 46b and the first contact unit 62c or the second contact unit 62d). However, instead of this configuration, a configuration may be employed where the rotation restriction unit 62 is provided with a known ratchet mechanism to cause the driving gear 46 to rotate idly.

(3) In the present embodiment, a configuration may be employed where the foot-unit accommodation unit 50s for accommodating the foot unit 62h is provided on the lower surface 50r of the driven gear 50. However, instead of this configuration, a configuration may be employed where the foot-unit accommodation unit 50s is not provided on the lower surface 50r and the foot unit 62h protrudes from the lower surface 50r to be pivotable to contact the lower surface 50r.

(4) In the present embodiment, a configuration may be employed where the foot unit 62h is a single foot unit extending in the opposite direction of the urging direction of the torsion spring 60. However, instead of this configuration, a configuration may be employed where a plurality of foot units are provided, and foot units extending in the urging direction of the torsion spring 60 may be provided, for example.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A valve drive device comprising a valve element drive mechanism configured to drive a valve element, wherein the valve element drive mechanism comprises:
   a motor;
   a driving gear configured to be rotationally driven by the motor;
   a driven gear configured to rotate the valve element by rotation of the driving gear while meshing with the driving gear; and
   a power transmission switching unit configured to switch between a power transmission state where the driving gear meshes with the driven gear to transmit power of the motor to the driven gear and a power non-transmission state where a meshing state between the driving gear and the driven gear is released,
   the power transmission switching unit comprises:
      at least one convex unit formed on the driving gear and configured to protrude toward a radial direction of the driving gear; and
      a rotation restriction unit that is pivotably mounted on the driven gear with respect to the driven gear and configured to be engageable with the at least one convex unit,
   the rotation restriction unit comprises:
      a pivot shaft inserted in the driven gear; and
      a lever unit extending from the pivot shaft in a circumferential direction of the driven gear and urged outward in a radial direction of the driven gear,
   the driven gear includes a lever pivoting restriction unit configured to contact the lever unit of the rotation restriction unit to restrict the rotation restriction unit from pivoting radially outward, and
   in a state where the lever pivoting restriction unit restricts the rotation restriction unit from pivoting, a gap is formed between the lever pivoting restriction unit and the pivot shaft.

2. The valve drive device according to claim 1, wherein the lever unit of the rotation restriction unit comprises a first contact unit configured to contact the at least one convex unit when the driving gear rotates in a first direction, and a second contact unit configured to contact the at least one convex unit when the driving gear rotates in a second direction that is opposite to the first direction,
   when the at least one convex unit contacts the first contact unit, the rotation restriction unit is pressed by the at least one convex unit to rotate the driven gear, and teeth of the driving gear and teeth of the driven gear mesh with each other such that the power transmission state is obtained, and
   when the at least one convex unit contacts the second contact unit, the rotation restriction unit pivots radially inward against an urging force that urges the rotation restriction unit, and the driving gear rotates idly without the teeth of the driving gear meshing with the teeth of the driven gear to maintain the power non-transmission state.

3. The valve drive device according to claim 2, wherein when a part of the second contact unit contacts the lever pivoting restriction unit, the lever unit being urged outward in the radial direction of the driven gear is restricted from pivoting radially outward.

4. The valve drive device according to claim 2, wherein the second contact unit of the lever unit is located on an outer peripheral side in the radial direction of the driven gear and is formed as a curved surface extending along the circumferential direction of the driven gear.

5. The valve drive device according to claim 2, wherein the driven gear comprises a co-rotation prevention unit configured to restrict the driven gear from rotating in a rotation direction in accordance with a rotation direction of the driving gear by being pressed by the at least one convex unit in a rotation direction of the at least one convex unit, when the at least one convex unit contacts the second contact unit and the rotation restriction unit pivots radially inward against the urging force that urges the rotation restriction unit.

6. The valve drive device according to claim 1, further comprising an urging member configured to urge the rotation restriction unit outward in the radial direction of the driven gear.

7. The valve drive device according to claim 6, further comprising, at a distal end of the lever unit, an urging member contact unit configured to receive an urging force of the urging member.

8. The valve drive device according to claim 7, wherein the urging member is a torsion spring held on a shaft unit of the driven gear, the driven gear is provided with a holding unit configured to hold one end of the torsion spring, and the other end of the torsion spring urges the urging member contact unit.

9. The valve drive device according to claim 1, wherein the driven gear has a protruding unit configured to protrude radially outward and in an axial direction of the driven gear from one surface of the driven gear, and on an inner side of the protruding unit in the radial direction of the driven gear, the lever pivoting restriction unit is formed.

10. The valve drive device according to claim 9, wherein the driven gear has a hole unit configured to penetrate the driven gear in the axial direction of the driven gear, a part of the hole unit is formed in the protruding unit, and the protruding unit has, at a position corresponding to the hole unit, a support surface extending along the axial direction of the driven gear and configured to support the pivot shaft.

* * * * *